United States Patent
Nagayama et al.

(10) Patent No.: US 7,901,591 B2
(45) Date of Patent: Mar. 8, 2011

(54) BIFUNCTIONAL POLYMERIZABLE COMPOUND, LIQUID CRYSTAL COMPOSITION, OPTICAL ANISOTROPIC MATERIAL AND OPTICAL ELEMENT

(75) Inventors: Hiromichi Nagayama, Koriyama (JP); Kazuhiko Shiono, Koriyama (JP); Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/536,751

(22) Filed: Aug. 6, 2009

(65) Prior Publication Data
US 2010/0038587 A1 Feb. 18, 2010

(30) Foreign Application Priority Data

Aug. 18, 2008 (JP) ................................. 2008-209842

(51) Int. Cl.
*C09K 19/00* (2006.01)
*C09K 19/06* (2006.01)
*C09K 19/52* (2006.01)

(52) U.S. Cl. .................. 252/299.01; 252/299.6; 428/1.1; 428/1.3; 430/20; 349/86; 349/88; 349/182; 349/183

(58) Field of Classification Search ............. 252/299.01, 252/299.1, 299.6; 428/1.1, 1.3; 430/20; 349/86, 88, 182–183
See application file for complete search history.

(56) References Cited

U.S. PATENT DOCUMENTS 7,459,189 B2 * 12/2008 Tahara et al. .................. 428/1.3

FOREIGN PATENT DOCUMENTS

| JP | 9-211409 | 8/1997 |
| JP | 2005-209327 | 8/2005 |

* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

A bifunctional polymerizable compound represented by the following formula:

$$A\text{-}E^1\text{-}E^2\text{-}(E^3)_k\text{-}E^4\text{-}B$$

wherein
A is $CH_2=CR^1-COO\text{-}(L^1)_m\text{-}$;
B is $CH_2=CR^2-COO\text{-}(L^2)_n\text{-}$;
each of $R^1$ and $R^2$ which are independent of each other, is a hydrogen atom or a methyl group;
each of $L^1$ and $L^2$ is $-(CH_2)_P-$ wherein p is each independently an integer of from 2 to 8, each of m and n which are independent of each other, is 0 or 1, provided that when at least one of m and n is 1, there may be an etheric oxygen atom between the carbon-carbon linkage of $-(CH_2)_P-$ or at the terminal on the side bonded to $E^1$ or $E^4$, and at least one hydrogen atom may be substituted by a fluorine atom, a chlorine atom or a methyl group;
each of $E^1$ and $E^4$ is a 1,4-phenylene group; and
one of $E^2$ and $E^3$ is a trans-1,4-cyclohexylene group and the other is a trans-1,4-cyclohexylene group or a 1,4-phenylene group, k is 0 or 1, provided that when k is 0, $E^2$ is a trans-1,4-cyclohexylene group, and the 1,4-phenylene group and the trans-1,4-cyclohexylene group as $E^1$ to $E^4$ may be each independently such that at least one hydrogen atom bonded to a carbon atom(s) constituting the cyclic group may be substituted by a fluorine atom, a chlorine atom or a methyl group.

16 Claims, 1 Drawing Sheet

BIFUNCTIONAL POLYMERIZABLE COMPOUND, LIQUID CRYSTAL COMPOSITION, OPTICAL ANISOTROPIC MATERIAL AND OPTICAL ELEMENT

BACKGROUND OF THE INVENTION

1. Field of the Invention

The present invention relates to a novel bifunctional polymerizable compound, a liquid crystal composition containing it, an optical anisotropic material obtained by polymerizing the liquid crystal composition and an optical element.

2. Discussion of Background

Liquid crystal is roughly classified into thermotropic liquid crystal and lyotropic liquid crystal. The former itself forms a liquid crystal phase in a specific temperature range, and at a temperature higher than the temperature range, the liquid crystal is an isotropic liquid in a state where the respective molecules are randomly aligned, and it is a solid crystal at a temperature lower than the above range.

The thermotropic liquid crystal is classified into nematic liquid crystal, cholesteric liquid crystal, smectic liquid crystal, etc. The cholesteric liquid crystal comprises a pile of many layers, and in each thin layer, liquid crystal molecules are aligned so that their major axes are in parallel with the layer and their directions are in order. The directions of the molecules vary little by little by adjacent layers and as a whole, a helical structure is formed. Therefore, the liquid crystal molecules show specific optical characteristics. Specifically, the liquid crystal molecules are aligned such that they are twisted helically and as a result, either one of left and right circularly polarized light components is selectively reflected depending upon the helical pitch. For example, the transmittance of the cholesteric liquid crystal is measured using a circularly polarized light which is selectively reflected, a transmission spectrum having a steep wavelength dependence, i.e. a spectrum having a rectangle in the wavelength region with selective reflection, is obtained. This property can be applied to a mirror which reflects light at a specific wavelength, refractive index anomalous dispersion utilizing reflection, etc. Accordingly, the cholesteric liquid crystal is utilized for various optical elements. For example, JP-A-2005-209327 discloses a polarizing diffraction element constituted by using a cholesteric liquid crystal.

The origin of the word of the cholesteric liquid crystal is that many cholesterol esters belong thereto. The reason of the twisted structure is considered to be because molecules have structural asymmetry called optical activity (chirality) and accordingly when the molecules are overlaid, they form gentle distortion in the spatial arrangement. A commonly used cholesteric liquid crystal is obtained by adding a chiral dopant having e.g. a center of asymmetry to a common relatively low molecular weight nematic liquid crystal or smectic liquid crystal. However, with respect to such a common relatively low molecular weight cholesteric liquid crystal, when influenced by the surrounding temperature change, the helical pitch varies and as a result, the above reflection properties vary and thus the selective reflection wavelength varies. Further, the twisted alignment structure of the liquid crystal molecules are less stable, and the alignment state may be disturbed when subjected to an impact in some cases, such being problematic in formation of an optical element.

Considering favorable temperature characteristics and high reliability in formation of an optical element, suitable is a polymer type cholesteric polymer liquid crystal with excellent reliability. A cholesteric polymer liquid crystal is obtained by polymerizing a cholesteric liquid crystal composition comprising a nematic or smectic liquid crystalline compound having polymerizable functional groups and a chiral dopant having a polymerizable functional group.

However, of the polymerizable cholesteric liquid crystal composition, subtle disturbance and crystals in alignment of the liquid crystal occur by polymerization, and fluctuations in characteristics and light scattering derived therefrom occurs. As a result, in many cases, the rectangle of the selective reflection varies. Specifically, the steep wavelength dependence is impaired, and the rectangle spectrum is broadened. That means, from the viewpoint of the transmittance in the vicinity of the selective reflection region, the transmittance is decreased. That is, the light utilization efficiency can hardly be secured in an optical element utilizing the transmitted light at a wavelength in the vicinity of the selective reflection region.

Further, with respect to an optical element in recent years, the increase in intensity of light to be used and use of short wavelength light are in progress. Accordingly, a polymer type cholesteric polymer liquid crystal is required to have favorable light resistance, particularly not to impair light resistance of an optical element against blue light (wavelength: 300 nm to 450 nm). When a material inferior in light resistance is used for an optical element, a decrease in the transmittance and an increase in the optical distortion occur with time, and stable use over a long period of time will be difficult.

Accordingly, it is preferred that the polymer type cholesteric polymer liquid crystal does not contain a structure and a moiety which may decrease light resistance in its molecular structure as far as possible. Specifically, it is required to design the liquid crystal so as not to contain a structure which absorbs light at a relatively short wavelength, such as blue light, among lights to be used for an optical element, and is deteriorated. For example, JP-A-9-211409 discloses a monomer containing a terphenyl structure having three 1,4-phenylene groups connected in its molecule. However, in a case where a polymer type cholesteric polymer liquid crystal is formed by using such a monomer, a polymer liquid crystal to be obtained contains a terphenyl structure which is likely to absorb a short wavelength light and to be deteriorated. Accordingly, it is easily estimated that realization of favorable light resistance of an optical element against a blue light is difficult.

SUMMARY OF THE INVENTION

The present invention has been made to overcome the above problems, and it is an object of the present invention to select the structure of a polymer type cholesteric polymer liquid crystal so as not to impair the light resistance, and to suppress broadening of the rectangle of selective reflection, i.e. broadening of the transmittance (reflectance) spectrum shape thereby to prevent the transmission loss in the vicinity of the selective reflection region. That is, it is an object of the present invention to provide a bifunctional polymerizable compound capable of providing such a polymer liquid crystal and to provide a liquid crystal composition using it, and in addition, to provide an optical anisotropic material formed substantially without decreasing the effective Δn realized by the liquid crystal composition, and an optical element using it.

Other objects and advantages of the present invention will be clear from the following description.

According to a first aspect of the present invention, there is provided a bifunctional polymerizable compound represented by the following formula (1):

$$A\text{-}E^1\text{-}E^2\text{-}(E^3)_k\text{-}E^4\text{-}B \qquad (1)$$

wherein

A is $CH_2=CR^1-COO-(L^1)_m-$;

B is $CH_2=CR^2-COO-(L^2)_n-$;

each of $R^1$ and $R^2$ which are independent of each other, is a hydrogen atom or a methyl group;

each of $L^1$ and $L^2$ is $-(CH_2)_p-$ wherein p is each independently an integer of from 2 to 8, each of m and n which are independent of each other, is 0 or 1, provided that when at least one of m and n is 1, there may be an etheric oxygen atom between the carbon-carbon linkage of $-(CH_2)_p-$ or at the terminal on the side bonded to $E^1$ or $E^4$, and at least one hydrogen atom may be substituted by a fluorine atom, a chlorine atom or a methyl group;

each of $E^1$ and $E^4$ is a 1,4-phenylene group; and one of $E^2$ and $E^3$ is a trans-1,4-cyclohexylene group and the other is a trans-1,4-cyclohexylene group or a 1,4-phenylene group, k is 0 or 1, provided that when k is 0, $E^2$ is a trans-1,4-cyclohexylene group, and the 1,4-phenylene group and the trans-1,4-cyclohexylene group as $E^1$ to $E^4$ may be each independently such that at least one hydrogen atom bonded to a carbon atom(s) constituting the cyclic group may be substituted by a fluorine atom, a chlorine atom or a methyl group.

According to the first aspect of the present invention, the formula (1) is preferably the following formula (1X):

$$A-E^1-E^2-(E^3)_k-E^4-A \quad (1X)$$

According to the first aspect of the present invention, when a 1,4-phenylene group is represented as -Ph- and the trans-1,4-cyclohexylene group is represented as -Cy-, $-E^1-E^2-(E^3)_k-E^4-$ in the formula (1) or (1X) is preferably -Ph-Cy-Ph-Ph-,-Ph-Cy-Cy-Ph- or -Ph-Cy-Ph-.

According to the first aspect of the present invention, each of m and n in the formulae (1) and (1X) is preferably 1.

According to the first aspect of the present invention, at least one of $E^1$ to $E^4$ in the formulae (1) and (1X) is preferably a group having at least one hydrogen atom bonded to a carbon atom(s) in a 1,4-phenylene group or a trans-1,4-cyclohexylene group substituted by a methyl group.

According to a second aspect of the present invention, there is provided a liquid crystal composition containing the bifunctional polymerizable compound according to the first aspect of the present invention.

According to a third aspect of the present invention, there is provided a cholesteric liquid crystal composition containing the bifunctional polymerizable compound according to the first aspect of the present invention, a monofunctional polymerizable compound and a polymerizable chiral material.

According to a fourth aspect of the present invention, there is provided an optical anisotropic material comprising a polymer obtained by polymerizing the liquid crystal composition according to the second or third aspect of the present invention in a state where the liquid crystal composition shows a liquid crystal phase and the liquid crystal is aligned.

According to a fifth aspect of the present invention, there is provided an optical element having a structure in which the optical anisotropic material according to the fourth aspect of the present invention is sandwiched between a pair of supports.

According the first aspect of the present invention, a bifunctional polymerizable compound can be obtained, which is used as a constituting material of a polymer type cholesteric polymer liquid crystal, which can suppress broadening of the rectangle of selected reflection and prevent the transmittance loss in the vicinity of the selective reflection region, and which is molecularly designed so as not to impair the light resistance.

According to the second aspect of the present invention, a liquid crystal composition suitable as a material of an optical element, which contains a bifunctional polymerizable compound which is molecularly designed so as not to impair the light resistance, can be obtained.

According to the third aspect of the present invention, a liquid crystal composition suitable as a material of an optical element, which contains a bifunctional polymerizable compound which is molecularly designed so as not to impair the light resistance, can be obtained.

According to the fourth aspect of the present invention, an optical anisotropic material which can suppress broadening of the rectangle of the selective reflection and prevent the transmission loss in the vicinity of the selective reflection region can be provided, since a liquid crystal composition containing a bifunctional polymerizable compound which is molecularly designed so as not to impair the light resistance is used as a material.

According to the fifth aspect of the present invention, an optical element excellent in the light resistance can be obtained.

DETAILED DESCRIPTION OF THE PREFERRED EMBODIMENTS

Figure 1:
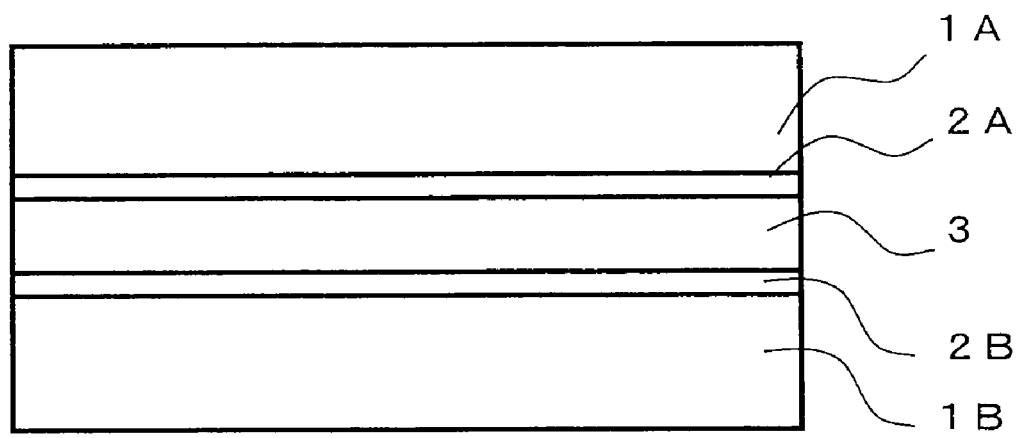
FIG. 1 is a cross section illustrating a state of an optical element of the present invention before polymerization.

In the present specification, a compound represented by the formula (1) will sometimes be referred to as a compound (1). The same applies to other compounds.

In the present specification, a 1,4-phenylene group and a trans-1,4-cyclohexylene group may be a non-substituted group or may be a group having at least one hydrogen atom bonded to a carbon atom(s) constituting the ring moiety of the cyclic group substituted by a fluorine atom, a chlorine atom or a methyl group. Such a cyclic group has bonds at 1- and 4-positions, and in the present specification, the left side of the cyclic group is regarded as the 1-position, and the right side of the cyclic group is regarded as the 4-position. Further, in a case where the cyclic group is a 1,4-cyclohexylene group, the bonds at the 1- and 4-positions make a trans-isomer.

In a case where the alkyl group has a structurally isomeric group, all such groups are included, and among them, a linear alkyl group is preferred.

In the following, "-Ph-" represents the 1,4-phenylene group which may have a substituent, and "-Cy-" represents the above trans-1,4-cyclohexylene group which may have a substituent. Further, a compound having both liquid crystallinity and polymerizability will be referred to as a polymerizable liquid crystal. Further, the following description regarding the wavelength is meant to cover the range of the center wavelength ±2 nm. Further, the refractive index anisotropy will be abbreviated as Δn.

The bifunctional polymerizable compound of the present invention is a compound represented by the following formula (1). The compound (1) is one type of a polymerizable liquid crystal having both polymerizability and liquid crystallinity or a polymerizable material with which a polymerizable liquid crystal composition is easily constituted in combination with other material.

$$A-E^1-E^2-(E^3)_k-E^4-B \quad (1)$$

In the formula (1), A is $CH_2=CR^1-COO-(L^1)_m-$, B is $CH_2=CR^2-COO-(L^2)_n-$, and each of $R^1$ and $R^2$ which are independent of each other, is a hydrogen atom or a methyl group, and they are preferably hydrogen atoms. When $R^1$ and $R^2$ are hydrogen atoms, polymerization will quickly proceed when a liquid crystal composition containing the compound (1) is photo-polymerized to obtain an optical anisotropic material comprising a polymer type cholesteric polymer liquid crystal and an optical element. Further, properties of the optical anisotropic material obtained by photopolymerization and the optical element are less likely to influenced by the external environment such as the temperature.

In the formula (1), each of $L^1$ and $L^2$ is $-(CH_2)_P-$ wherein P is independently an integer of from 2 to 8, and each of m and n which are independent of each other, is 0 or 1, provided that when at least one of m and n is 1, there is preferably an etheric oxygen atom between the carbon-carbon linkage of $-(CH_2)_P-$ or at the terminal on the side bonded to $E^1$ or $E^4$. In general, when a polymerizable liquid crystal composition is polymerized, the value of Δn tends to decrease after the polymerization, and in a case where $L^1$ and $L^2$ are a group having a polymethylene group such as $-(CH_2)_PO-$ or $-(CH_2)_P-$, the decrease in the value Δn after the polymerization can be suppressed. That is, the decrease in the effective Δn value can be suppressed also in the cholesteric liquid crystal composition. Further, at least one hydrogen atom in $L^1$ and $L^2$ may be substituted by a fluorine atom, a chlorine atom or a methyl group.

Each of $E^1$ and $E^4$ is a 1,4-phenylene group, one of $E^2$ and $E^3$ is a trans-1,4-cyclohexylene group and the other is a trans-1,4-cyclohexylene group or a 1,4-phenylene group, and k is 0 or 1, provided that when k is 0, $E^2$ is a trans-1,4-cyclohexylene group.

Since the value of Δn can be increased when a plurality of 1,4-phenylene groups are contained, it is preferred that two 1,4-phenylene groups are adjacent to each other. Further, the value of Δn can be increased also when a plurality of trans-1,4-cyclohexylene groups are contained. The structure of "-$E^1$-$E^2$-$(E^3)_k$-$E^4$-" may be "-Ph-Cy-Ph-Ph-", "-Ph-Cy-Cy-Ph-" or "-Ph-Cy-Ph-". Among them, with a view to increasing Δn of the compound (1), i.e. with a view to increasing Δn of the cholesteric liquid crystal composition, preferred is "-Ph-Cy-Ph-Ph-" or "-Ph-Cy-Cy-Ph-". Further, with a view to lowering the melting point of the compound (1), i.e. with a view to lowering the melting point of the cholesteric liquid crystal composition, preferred is "-Ph-Cy-Ph-". In the case of an optical element using the cholesteric liquid crystal composition, it is important that the effective Δn is maintained in many cases and accordingly, among the above three structures, "-Ph-Cy-Ph-Ph-" is particularly preferred.

As the compound (1), the following compounds (1A) to (1C) are particularly preferred.

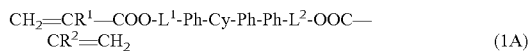
(1A)

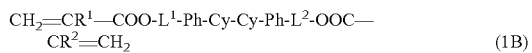
(1B)

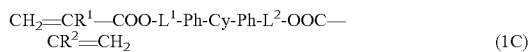
(1C)

Among the compounds (1A) to (1C), preferred is a compound wherein $R^1$ is a hydrogen atom, particularly preferred is a compound wherein each of $L^1$ and $L^2$ is $-(CH_2)_PO-$ (P is particularly preferably each independently an integer of from 4 to 6).

In the formula (1), the 1,4-phenylene group and the trans-1,4-cyclohexylene group in $E^1$ to $E^4$ may be such that at least one hydrogen atom bonded to a carbon atom(s) may be substituted by a fluorine atom, a chlorine atom or a methyl group.

In the present invention, the 1,4-phenylene group is preferably a non-substituted group, a group substituted by one fluorine atom or a group substituted by one methyl group. In a case where the 1,4-phenylene group has such a substituent, an effect of lowering the melting point and the viscosity of the compound (1) will be obtained. Further, the trans-1,4-cyclohexylene group is preferably a non-substituted group.

The compound (1) is preferably a compound represented by the following formula. This compound is one type of a polymerizable liquid crystal having both polymerizability and liquid crystallinity or a material with which a polymerizable liquid crystal composition is easily constituted in combination with other material.

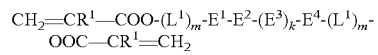

In the above compound, as evident from the formula, $CH_2=CR^1-COO-(L^1)_m-$ bonded to $E^1$ and $-(L^1)_m-OOC-CR^1=CH_2$ bonded to $E^4$ are the same, and when attention is focused on these moieties, the compound has a molecular structure symmetric at both ends having functionality. That is, the above compound is the compound (1) wherein A and B are the same. Accordingly, the above compound may also be represented by the following formula (1X):

 (1X)

In the formula (1X), A is $CH_2=CR^1-COO-(L^1)_m-$, and the other structure is the same as the compound (1).

That is, in the formula (1X), $R^1$ is a hydrogen atom or a methyl group, preferably a hydrogen atom. When $R^1$ is a hydrogen atom, polymerization will quickly proceed when a liquid crystal composition containing the after-mentioned compound (2) is photo-polymerized to obtain an optical anisotropic material and an optical element. Further, properties of the optical anisotropic material obtained by photopolymerization and the optical element are less likely to be influenced by the external environment such as the temperature.

$L^1$ is $-(CH_2)_PO-$ or $-(CH_2)_P-$, preferably $-(CH_2)_PO-$. P is an integer of from 2 to 8. In general, when a polymerizable liquid crystal composition is polymerized, the value of Δn tends to decrease after the polymerization, and when $L^1$ is a group having a polymethylene group such as $-(CH_2)_PO-$ or $(CH_2)_P-$, the decrease in the Δn value after the polymerization can be suppressed. That is, the decrease in the effective Δn value also in the cholesteric liquid crystal composition can be suppressed.

Each of $E^1$ and $E^4$ is a 1,4-phenylene group, and each of $E^2$ and $E^3$ which are independent of each other, is a 1,4-phenylene group or a trans-1,4-cyclohexylene group. At least one of $E^2$ and $E^3$ is a trans-1,4-cyclohexylene group, provided that when k=0, $E^2$ is a trans-1,4-cyclohexylene group. Further, it is preferred that two 1,4-phenylene groups are adjacent to each other since the value of Δn can be increased when a plurality of 1,4-phenylene groups are contained. Further, the value of Δn can be increased also when a plurality of trans-1,4-cyclohexylene groups are contained.

The structure of "-$E^1$-$E^2$-$(E^3)_k$-$E^4$-" may be "-Ph-Cy-Ph-Ph-", "-Ph-Cy-Cy-Ph-" or "-Ph-Cy-Ph-". Among them, with a view to increasing Δn of the compound (1X), i.e. with a view to increasing Δn of the cholesteric liquid crystal composition, preferred is "-Ph-Cy-Ph-Ph-" or "-Ph-Cy-Cy-Ph-". Further, with a view to lowering the melting point of the compound (1X), i.e. with a view to lowering the melting point of the cholesteric liquid crystal composition, preferred is "-Ph-Cy-Ph-". In the case of an optical element using the cholesteric liquid crystal composition, it is important that the effective Δn is maintained in many cases and accordingly, among the above three structures, "-Ph-Cy-Ph-Ph-" is particularly preferred.

As the compound (1X), the following compounds (1AX) to (1CX) are preferred.

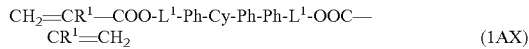  (1AX)

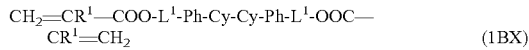  (1BX)

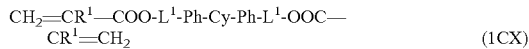  (1CX)

Among the compounds (1AX) to (1CX), preferred is a compound wherein $R^1$ is a hydrogen atom, particularly preferred is a compound wherein $-L^1-$ is $—(CH_2)_PO—$ (P is particularly preferably an integer of from 4 to 6).

In the formula (1X), the 1,4-phenylene group and the trans-1,4-cyclohexylene group as $E^1$ to $E^4$ may be such that a hydrogen atom(s) bonded to a carbon atom(s) may be substituted by a fluorine atom, a chlorine atom or a methyl group. In the present invention, the 1,4-phenylene group is preferably a non-substituted group, a group substituted by one fluorine atom or a group substituted by one methyl group. In a case where the 1,4-phenylene group has such a substituent, an effect of lowering the melting point and the viscosity of the compound (1X) will be obtained. Further, the trans-1,4-cyclohexylene group is preferably a non-substituted group.

As the compound (1X), the following compounds are preferred, and compounds (1A-1), (1B-1) and (1C-2) are particularly preferred. In the formulae, p is as defined above and is preferably an integer of from 4 to 6.

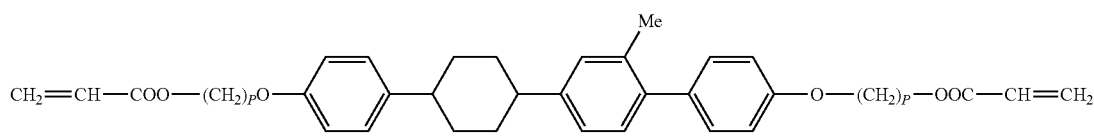  (1A-1)

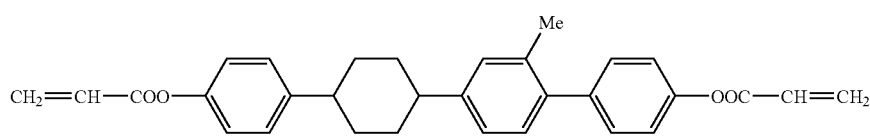  (1A-2)

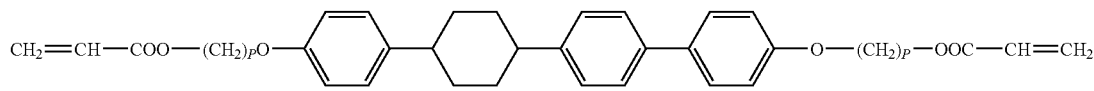  (1A-3)

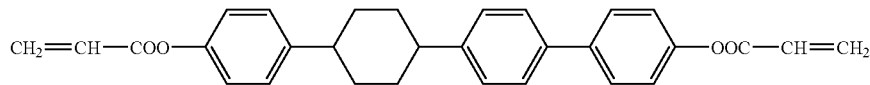  (1A-4)

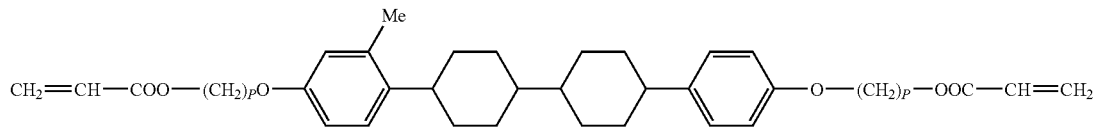  (1B-1)

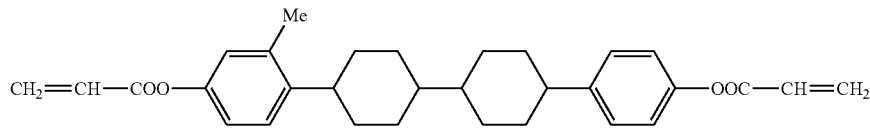  (1B-2)

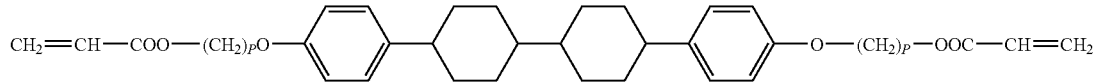  (1B-3)

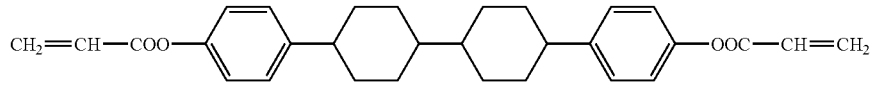  (1B-4)

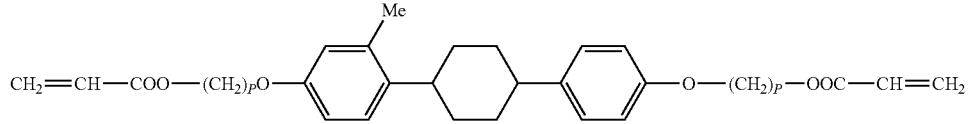  (1C-1)

-continued
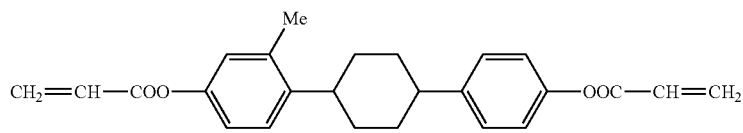
(1C-2)
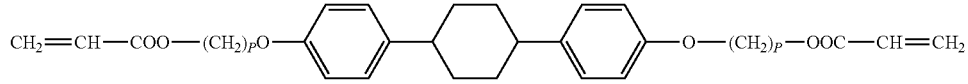
(1C-3)
(1C-4)
Now, a method for preparing the compound (1) of the present invention will be described with reference to specific examples. The symbols in the following formulae are as defined above.
(Preparation Method 1)
As a method for preparing the compound (1A-1), for example, the following method may be mentioned.
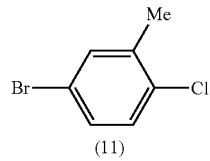
(11)
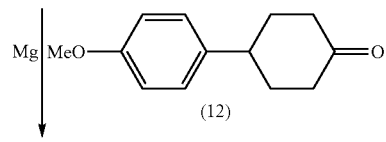
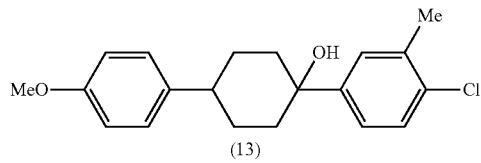
(13)
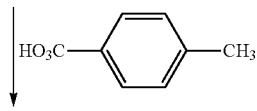
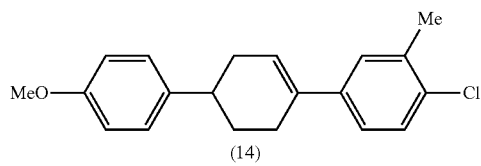
(14)
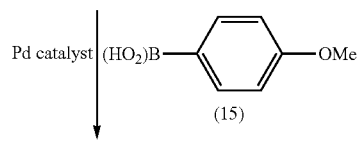
(15)

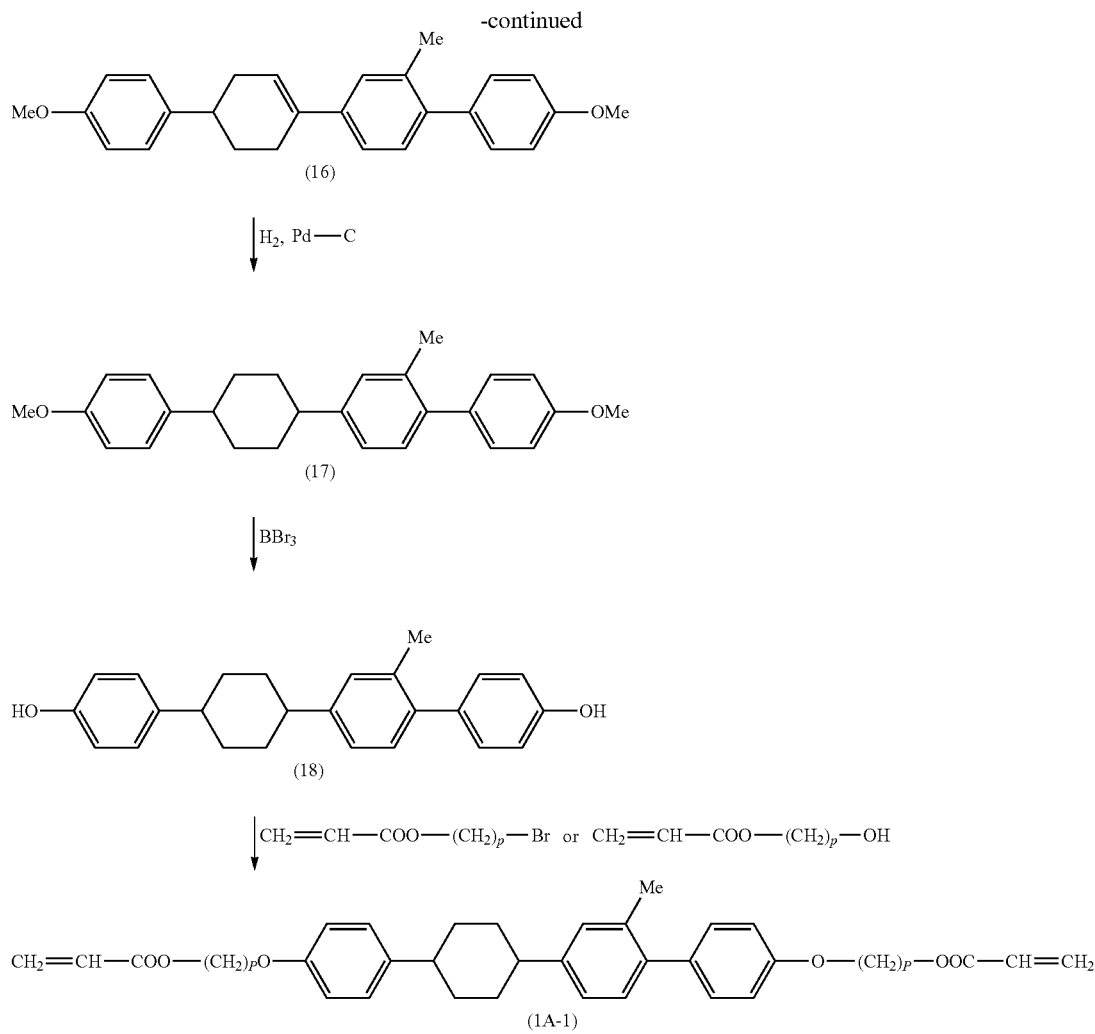

First, magnesium is reacted with a compound (11) to prepare a Grignard reagent, which is reacted with a compound (12) to obtain a compound (13). Then, the compound (13) is reacted with p-toluenesulfonic acid to obtain a compound (14). Then, the compound (14) is reacted with a compound (15) in the presence of a palladium catalyst to obtain a compound (16). Then, the compound (16) is reacted with hydrogen gas in the presence of palladium-activated carbon to obtain a compound (17). Then, the compound (17) is reacted with boron tribromide to obtain a compound (18). Then, the compound (18) is reacted with $CH_2$=CH—COO—$(CH_2)_P$—Br or $CH_2$=CH—COO—$(CH_2)_P$—OH to obtain a compound (1A-1).

When the compound (18) is reacted with $CH_2$=CH—COO—$(CH_2)_P$—Br or $CH_2$=CH—COO—$(CH_2)_P$—OH to obtain the compound (1A-1), a bifunctional polymerizable compound (1) having asymmetric acryloyloxy moieties and having $L^1$ and $L^2$ in a desired structure can be obtained by carrying out reaction with a material acrylate having a desired structure in 1.1 equivalent amounts, followed by purification, and carrying out reaction with an acrylate having another structure in 1.1 equivalent amounts, followed by purification.

Further, a compound (1A-3) can be prepared by changing the compound (11) in the Preparation Method 1 to 1-bromo-4-chlorobenzene. Further, the compound of the formula (1) wherein $R^1$ is a methyl group can also be prepared by changing $CH_2$=CH—COO—$(CH_2)_P$—Br or $CH_2$=CH—COO—$(CH_2)_P$—OH to $CH_2$=C($CH_3$)—COO—$(CH_2)_P$—Br or $CH_2$=C($CH_3$)—COO—$(CH_2)_P$—OH.

In the flow for preparation of the compound (1A-1), when the compound corresponding to the compound (18) is reacted with $CH_2$=CH—COO—$(CH_2)_P$—Br or $CH_2$=CH—COO—$(CH_2)_P$—OH to obtain the compound (1A-3), a bifunctional polymerizable compound (1) having asymmetric acryloyloxy moieties and having $L^1$ and $L^2$ in a desired structure can be obtained by carrying out reaction with a material acrylate having a desired structure in 1.1 equivalent amounts, followed by purification, and carrying out reaction with an acrylate having another structure in 1.1 equivalent amounts, followed by purification.

A compound wherein $R^1$ is a hydrogen atom and m is 0 (i.e. a compound containing no L), such as the compound (1A-2) or the compound (1A-4), can be prepared by changing $CH_2$=CH—COO—$(CH_2)_P$—Br or $CH_2$=CH—COO—$(CH_2)_P$—OH to acryloyl chloride.

(Preparation Method 2)

As a method for preparing the compound (1B-1), the following method may be mentioned.

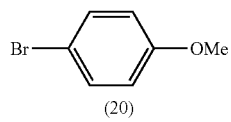
(20)
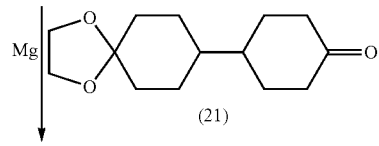
(21)
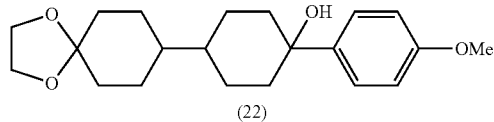
(22)
CF₃COOH
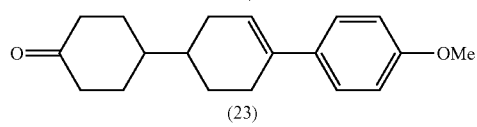
(23)
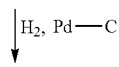
H₂, Pd—C
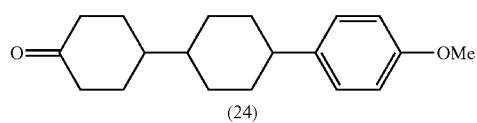
(24)
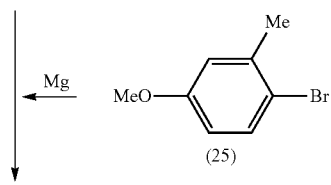
(25)
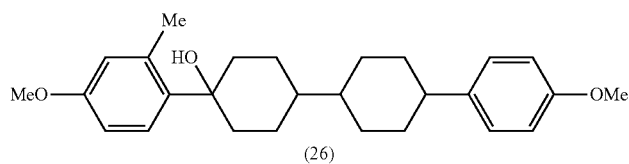
(26)
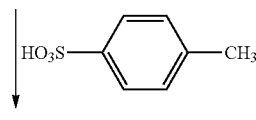
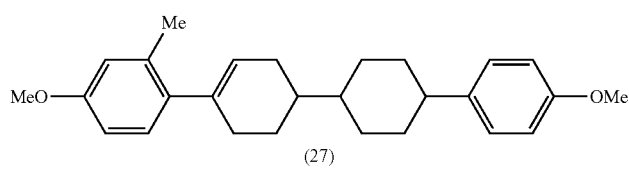
(27)
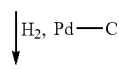
H₂, Pd—C

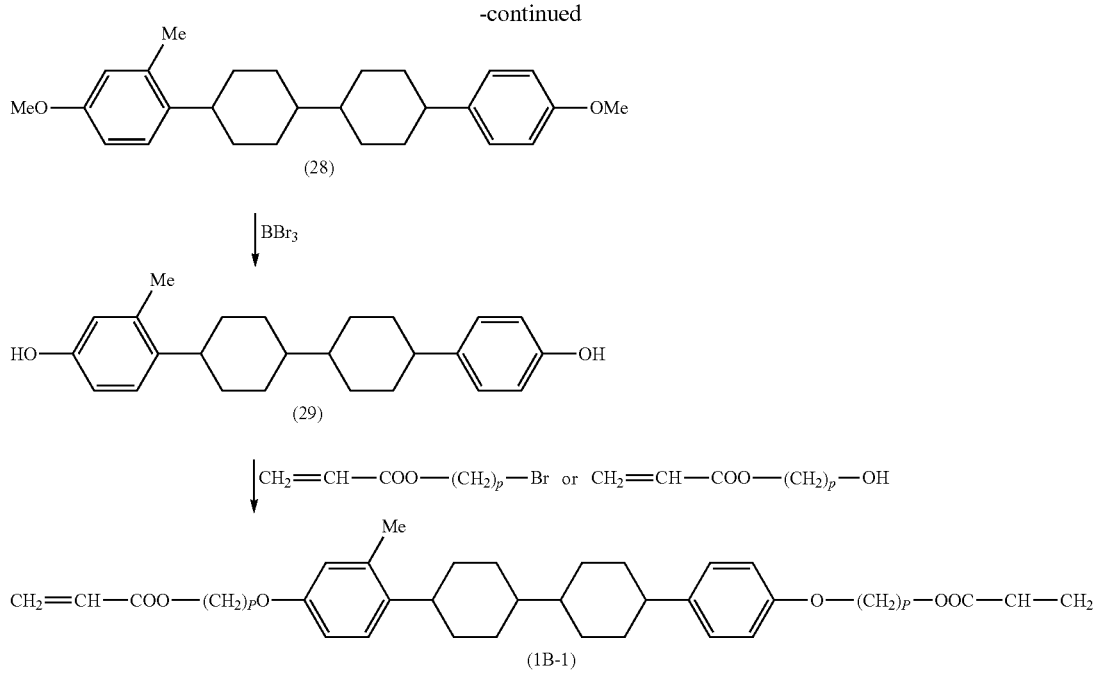

First, magnesium is reacted with a compound (20) to prepare a Grignard reagent, which is reacted with a compound (21) to obtain a compound (22). Then, the compound (22) is reacted with trifluoroacetic acid to obtain a compound (23). Then, the compound (23) is reacted with hydrogen gas in the presence of palladium-activated carbon to obtain a compound (24). Then, magnesium is reacted with a compound (25) to prepare a Grignard reagent, which is reacted with the compound (24) to obtain a compound (26). Then, the compound (26) is reacted with p-toluenesulfonic acid to obtain a compound (27), which is reacted with hydrogen gas in the presence of palladium-activated carbon to obtain a compound (28). Then, the compound (28) is reacted with boron tribromide to obtain a compound (29). Then, the compound (29) is reacted with $CH_2$=CH—COO—$(CH_2)_P$—Br or $CH_2$=CH—COO—$(CH_2)_P$—OH to obtain a compound (1B-1).

When the compound (29) is reacted with $CH_2$=CH—COO—$(CH_2)_P$—Br or $CH_2$=CH—COO—$(CH_2)_P$—OH to obtain the compound (1B-1), a bifunctional polymerizable compound (1) having asymmetric acryloyloxy moieties and having $L^1$ and $L^2$ in a desired structure can be obtained by carrying out reaction with a material acrylate having a desired structure in 1.1 equivalent amounts, followed by purification, and carrying out reaction with an acrylate having another structure in 1.1 equivalent amounts, followed by purification.

(Preparation Method 3)

The compound (1B-3) can be prepared by changing the compound (25) in the Preparation Method 2 to 4-bromoanisole. Further, a compound wherein $R^1$ is a methyl group can similarly be prepared by changing $CH_2$=CH—COO—$(CH_2)_P$—Br to $CH_2$=C($CH_3$)—COO—$(CH_2)_P$—Br or $CH_2$=C($CH_3$)—COO—$(CH_2)_P$—OH. Further, a compound wherein $R^1$ is a hydrogen atom and m is 0 (i.e. a compound containing no L), such as the compound (1B-2) or the compound (1B-4), can be prepared by changing $CH_2$=CH—COO—$(CH_2)_P$—Br or $CH_2$=CH—COO—$(CH_2)_P$—OH to acryloyl chloride.

(Preparation Method 4)

As a method for preparing the compound (1C-1), the following method may be mentioned.

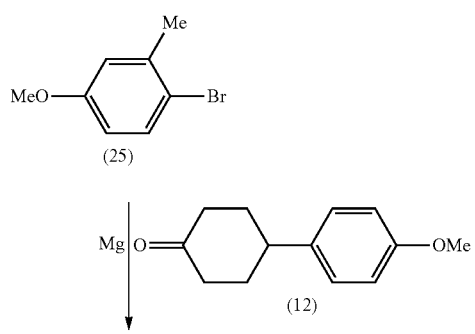

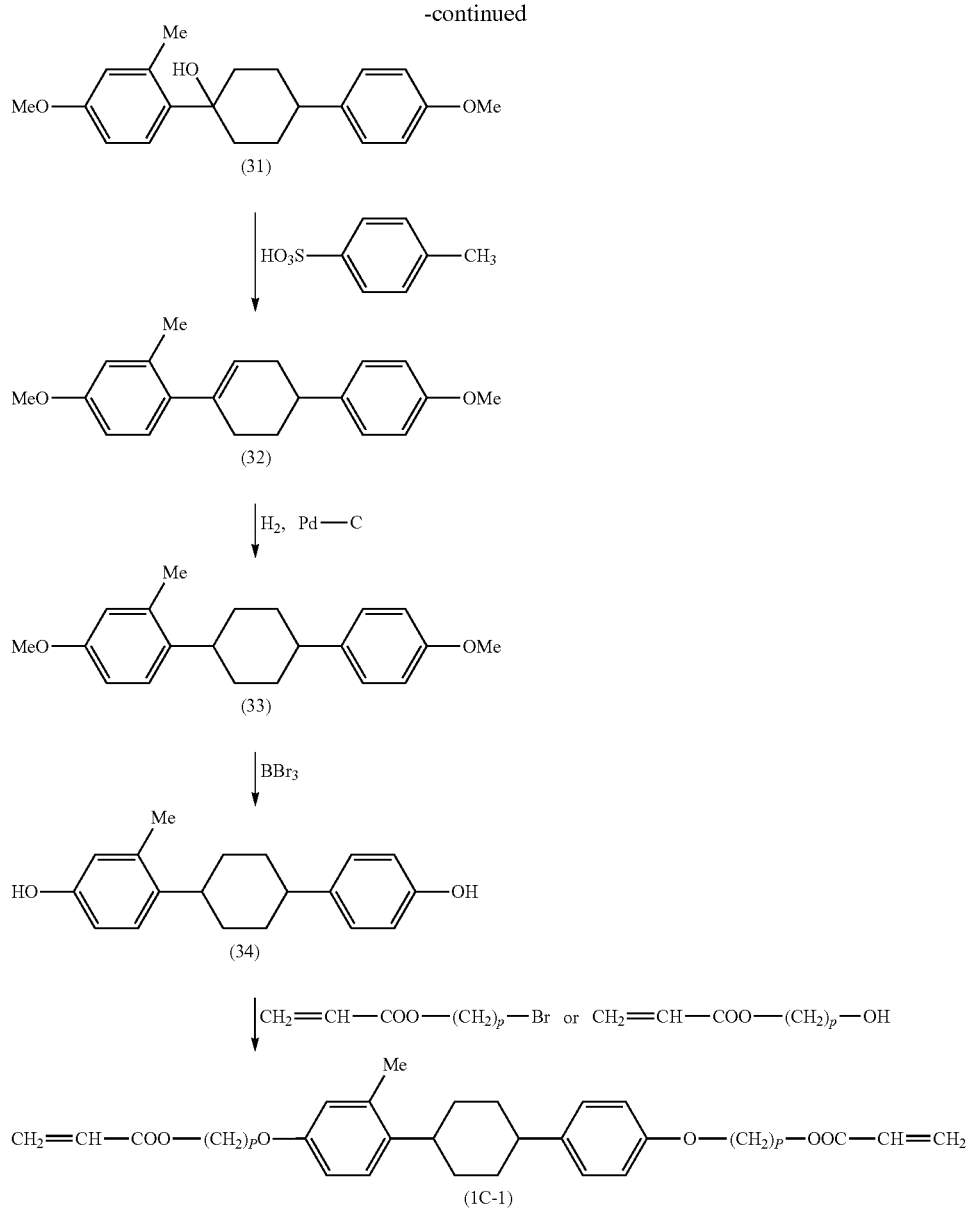

First, magnesium is reacted with a compound (25) to prepare a Grignard reagent, which is reacted with a compound (12) to obtain a compound (31). Then, the compound (31) is reacted with p-toluenesulfonic acid to obtain a compound (32). Then, the compound (32) is reacted with hydrogen gas in the presence of palladium-activated carbon to obtain a compound (33). Then, the compound (33) is reacted with boron tribromide to obtain a compound (34), which is reacted with $CH_2$=CH—COO—$(CH_2)_P$—Br or $CH_2$=CH—COO—$(CH_2)_P$—OH to obtain a compound (1C-1).

When the compound (34) is reacted with $CH_2$=CH—COO—$(CH_2)_P$—Br or $CH_2$=CH—COO—$(CH_2)_P$—OH to obtain the compound (1C-1), a bifunctional polymerizable compound (1) having asymmetric acryloyloxy moieties and having $L^1$ and $L^2$ in a desired structure can be obtained by carrying out reaction with a material acrylate having a desired structure in 1.1 equivalent amounts, followed by purification, and carrying out reaction with an acrylate having another structure in 1.1 equivalent amounts, followed by purification.

(Preparation Method 5)

The compound (1C-3) can be prepared by changing the compound (25) in the Preparation Method 4 to 4-bromoanisole. Further, a compound wherein $R^1$ is a methyl group can similarly be prepared by changing $CH_2$=CH—COO—$(CH_2)_P$—Br or $CH_2$=CH—COO—$(CH_2)_P$—OH to $CH_2$=C($CH_3$)—COO—$(CH_2)_P$—Br or $CH_2$=C($CH_3$)—COO—$(CH_2)_P$—OH. Further, a compound wherein $R^1$ is a hydrogen atom and m is 0 (i.e. a compound containing no L), such as the compound (1C-2) or the compound (1C-4), can be prepared by changing $CH_2$=CH—COO—$(CH_2)_P$—Br or $CH_2$=CH—COO—$(CH_2)_P$—OH to acryloyl chloride.

By adding the compound (1) of the present invention to a cholesteric liquid crystal composition comprising the aftermentioned compounds (2-1) and (2-2) and a polymerizable chiral dopant, the loss of the transmittance of a polymer in the vicinity of the cholesteric selective reflection region can be suppressed, since the compound (1) is bifunctional, whereby disturbance of the alignment of the cholesteric liquid crystal phase when the cholesteric liquid crystal composition is polymerized can be suppressed.

Further, when the compound (1) has two or more 1,4-phenylene groups in $E^1$ to $E^4$, the effective Δn in the cholesteric liquid crystal can be increased. Further, the value of the effective Δn tends to decrease in general when a polymerizable liquid crystal composition (nematic phase or cholesteric phase) is polymerized, but in a case where a structure having a polymethylene group is bonded to an acryloyl group or a methacryloyl group, i.e. in a case where k=1 and the -L- moiety is —$(CH_2)_pO$— or —$(CH_2)_p$—, the decrease in the effective Δn value can be suppressed.

Accordingly, by using the compound (1), an optical anisotropic material and an optical element excellent in the transmittance characteristics in the vicinity of the selective reflection region can be provided. Particularly when k is 1, a high effective Δn value can be maintained even after polymerization, whereby an optical anisotropic material and an optical element having more excellent properties can be provided.

The compound (1) of the present invention is preferably used as one component of a liquid crystal composition to obtain a cholesteric polymer liquid crystal. The compound (1) has such characteristics that when formed into a polymerizable liquid crystal composition by itself, in combination or in combination with another material, it has a sufficiently broad liquid crystal temperature range, and particularly its temperature range showing a liquid crystal phase is broad at a high temperature side. In order that the liquid crystal composition to obtain a polymer liquid crystal shows liquid crystallinity also at a low temperature side, a liquid crystal composition containing at least two types of the compounds (1) or a liquid crystal composition containing at least one type of the compound (1) and at least one type of a polymerizable liquid crystal other than the compound (1) may be formed. By such a liquid crystal composition, the temperature range showing the liquid crystal phase can be further broadened. Further, by the above composition, the melting point (Tm) can be lowered, thus leading to high handling efficiency. In the following, the polymerizable liquid crystal other than the compound (1) will be referred to as a compound (2).

When the liquid crystal composition contains the compound (1) and the compound (2), the compound (2) is preferably a compound having an acryloyl group or a methacryloyl group, particularly preferably a compound having an acryloyl group. Further, the compound (2) preferably has a molecular structure analogous to the compound (1), whereby the liquid crystal composition containing the compound (1) and the compound (2) shows a stable nematic liquid crystal phase, and a polymerizable chiral dopant (3) is added, it shows a favorable cholesteric liquid crystal phase.

The compound (2) is preferably a compound represented by the following formula (2-1) (compound (2-1)) or a compound represented by the following formula (2-2) (compound (2-2)).

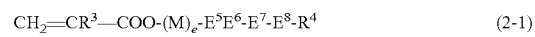

$$CH_2\!\!=\!\!CR^3\!\!-\!\!COO\text{-}(M)_e\text{-}E^5E^6\text{-}E^7\text{-}E^8\text{-}R^4 \quad (2\text{-}1)$$

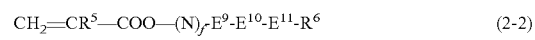

$$CH_2\!\!=\!\!CR^5\!\!-\!\!COO\text{—}(N)_f\text{-}E^9\text{-}E^{10}\text{-}E^{11}\text{-}R^6 \quad (2\text{-}2)$$

Symbols in the formulae have the following meanings.

$R^3$, $R^5$: Each independently a hydrogen atom or a methyl group.

$R^4$, $R^6$: Each independently a $C_{1-8}$ alkyl group.

m, n: Each independently 0 or 1.

M, N: Each independently —$(CH_2)_sO$— or —$(CH_2)_t$— (wherein s and t are each independently an integer of from 2 to 8).

$E^5$ to $E^{11}$: Each independently a 1,4-phenylene group or a trans-1,4-cyclohexylene group, provided that at least one of $E^6$ and $E^7$ is a trans-1,4-cyclohexylene group, and at least one of $E^9$ to $E^{11}$ is a trans-1,4-cyclohexylene group. The 1,4-phenylene group and the trans-1,4-cyclohexylene group may be such that a hydrogen atom(s) bonded to a carbon atom(s) may be substituted by a fluorine atom, a chlorine atom or a methyl group.

As the compound represented by the formula (2-1) or (2-2), preferred are the following compounds (2-1-1), (2-2-1) and (2-2-2):

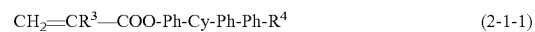

$$CH_2\!\!=\!\!CR^3\!\!-\!\!COO\text{-Ph-Cy-Ph-Ph-}R^4 \quad (2\text{-}1\text{-}1)$$

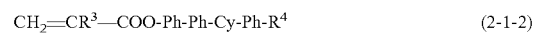

$$CH_2\!\!=\!\!CR^3\!\!-\!\!COO\text{-Ph-Ph-Cy-Ph-}R^4 \quad (2\text{-}1\text{-}2)$$

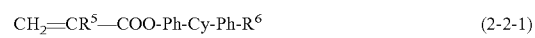

$$CH_2\!\!=\!\!CR^5\!\!-\!\!COO\text{-Ph-Cy-Ph-}R^6 \quad (2\text{-}2\text{-}1)$$

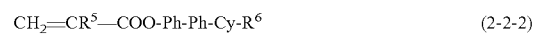

$$CH_2\!\!=\!\!CR^5\!\!-\!\!COO\text{-Ph-Ph-Cy-}R^6 \quad (2\text{-}2\text{-}2)$$

The polymerizable chiral dopant (3) to be contained in the cholesteric liquid crystal composition is not particularly limited, and is preferably e.g. a polymerizable chiral dopant comprising an isosorbide derivative or an isomannide derivative represented by the following formulae (3-1) to (3-4):

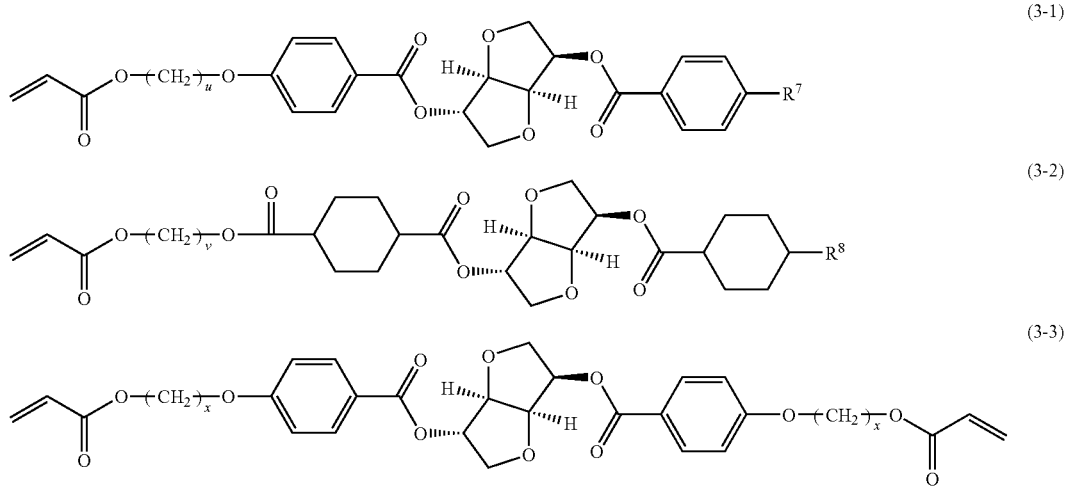

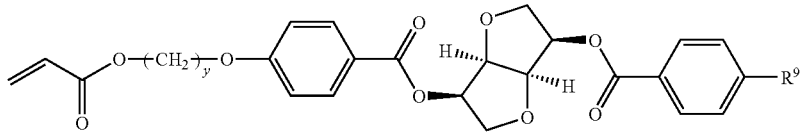

(3-4)

Symbols in the formulae (3-1) to (3-4) have the following meanings.

$R^7$ to $R^9$: Each independently a $C_{1-8}$ alkyl group.

u, v, x, y: An integer of from 2 to 8.

The composition to produce the cholesteric polymer liquid crystal is preferably a cholesteric liquid crystal composition containing at least 75 mass %, more preferably at least 90%, in total of the polymerizable nematic liquid crystal composition and the polymerizable chiral dopant. Such a cholesteric liquid crystal composition may contain a non-liquid crystalline polymerizable compound or a non-polymerizable liquid crystal compound. Even when the compound (1) of the present invention is a compound having no liquid crystallinity by itself, it constitutes the polymerizable nematic liquid crystal composition in combination with another polymerizable liquid crystal compound. The cholesteric liquid crystal composition is preferably a liquid crystal composition containing at least 75 mass %, particularly preferably at least 85 mass % of a polymerizable nematic liquid crystal composition. In the present invention, the composition to produce the cholesteric polymer liquid crystal preferably contains at least 2 mass % of the compound (1) based on all the polymerizable compounds in the cholesteric liquid crystal composition.

As described above, in the present invention, the nematic liquid crystal composition suitable for production of a cholesteric polymer liquid crystal, is a nematic liquid crystal composition containing at least one type of the compound (1) or a nematic liquid crystal composition containing at least one type of the compound (1) and at least one type of the compound (2). In the case of the latter, the ratio of the compound (1) to the total amount of the compound (1) and the compound (2) is preferably from 0.5 to 40 mass %, particularly preferably from 2.0 to 25.0 mass %. Further, since the compound (2) has a low molecular weight as compared with the compound (1) in many cases, the molar ratio of the compound (1) to the total amount of the compound (1) and the compound (2) is lower than the mass ratio in many cases. Accordingly, as represented by the molar ratio, the ratio of the compound (1) to the total amount of the compound (1) and the compound (2) is preferably at least 0.3 mol %, more preferably at least 1.2 mol %. Further, in the liquid crystal composition containing the compound (1) and the compound (2), the upper limit of the ratio of the compound (1) to the total amount of the compound (1) and the compound (2) is preferably 30 mol %. For example, in a case where the above compounds (2-1-1), (2-2-1) and (2-2-2) are used as the compound (2), the ratio of the compound (1) to all the polymerizable compounds is preferably from 0.3 to 30 mol %, particularly preferably from 1.2 to 25 mol %.

The cholesteric liquid crystal composition by the present invention may contain a component other than the polymerizable nematic liquid crystal composition and the polymerizable chiral dopant (hereinafter referred to as other component). Such other component may, for example, be a polymerization initiator, a polymerization inhibitor, a chiral agent, an ultraviolet absorber, an antioxidant, a light stabilizer or a dichromatic dye. The total amount of the polymerizable nematic liquid crystal and the polymerizable chiral dopant (hereinafter referred to as "the total amount of the cholesteric liquid crystal") and the ratio of other component are preferably adjusted depending upon the purpose of use.

In a case where a dichromatic dye is used as other component, the total amount of the cholesteric liquid crystal is preferably from 80 to 99 mass %, particularly preferably from 82 to 97 mass % based on the liquid crystal composition. The amount of the dichromatic dye is preferably from 1 to 20 mass %, particularly preferably from 3 to 18 mass % based on the liquid crystal composition. In a case where an ultraviolet absorber, an antioxidant, a light stabilizer or the like is used as other component, the amount of such a component is preferably at most 5 mass %, particularly preferably at most 3 mass % based on the liquid crystal composition. In such a case, the total amount of the cholesteric liquid crystal is preferably at least 95 and less than 100 mass %, particularly preferably at least 97 and less than 100 mass % based on the liquid crystal composition. The ratio of the polymerization initiator will be described hereinafter.

Now, the optical anisotropic material of the present invention will be described below.

The optical anisotropic material of the present invention comprises a polymer obtained by polymerizing the above cholesteric liquid crystal composition in a state where the liquid crystal composition shows a cholesteric phase and the cholesteric liquid crystal is aligned.

In order to maintain a state where the liquid crystal composition shows a liquid crystal phase, the atmospheric temperature is set to be at most the cholesteric phase/isotropic phase transition temperature (Tc). However, at a temperature close to Tc, the effective Δn of the cholesteric liquid crystal composition is very low and accordingly, the upper limit of the atmospheric temperature is preferably at most (Tc-10).

The polymerization may be photopolymerization or thermal polymerization, and photopolymerization is preferred. Light to be employed for photopolymerization is preferably ultraviolet rays or visible rays. In a case where photopolymerization is carried out, a photopolymerization initiator is preferably used, and preferred is a photopolymerization initiator suitably selected from an acetophenone, a benzophenone, a benzoin, a benzyl, a Michler's ketone, a benzoin alkyl ether, a benzyl dimethyl ketal and a thioxanthone. One or more types of the photopolymerization initiators may be used. The amount of the photopolymerization initiator is preferably from 0.01 to 5 mass %, particularly preferably from 0.03 to 2 mass % based on all the amount of the liquid crystal composition.

Now, the optical element of the present invention will be described with reference to FIG. 1.

The optical element of the present invention comprises a polymer obtained by sandwiching a liquid crystal composition 3 between a pair of supports 1A and 1B having alignment-treated surfaces 2A and 2B to which alignment treatment is applied, and polymerizing the liquid crystal composition in a state where it shows a liquid crystal phase and the liquid crystal is aligned.

The support is preferably a support made of a glass or resin transparent substrate having alignment treatment applied. The alignment treatment is carried out preferably by a method of directly rubbing the surface of the transparent substrate with fibers of e.g. cotton, wool, nylon or polyester, a method of laminating an alignment film of e.g. a polyimide on the surface of the transparent substrate, and rubbing the surface of the alignment film with e.g. the above fibers, or a method of obliquely depositing an inorganic material on the surface of the transparent substrate.

After the above supports are prepared, spacers such as glass beads are disposed on the surface to which the alignment treatment is applied, and a plurality of supports are faced to each other so as to have a predetermined distance. Then, the liquid crystal composition is sandwiched between the supports, followed by polymerization.

The polymerization may be carried out in the same manner as in preparation of the above optical anisotropic material. The polymer obtained by the polymerization may be used as sandwiched between the supports, or may be used as separated from the supports. The optical element of the present invention is an element containing the polymer, preferably the polymer as sandwiched between the supports.

With respect to the optical anisotropic material and the optical element of the present invention, the transmission loss in the vicinity of the selective reflection region of the cholesteric liquid crystal polymer can be suppressed. That is, they are useful as an optical anisotropic material and an optical element which suppress broadening of the cholesteric rectangle and do not substantially decrease the effective Δn of the composition. For example, they are used as mounted on an optical head device as a diffraction element such as a polarizing hologram utilizing circularly polarized light birefringence. As a polarizing hologram, there may, for example, be a case where signal lights due to the reflection of light emitted from a laser light source on an information recorded surface of an optical disk, are separated and then introduced into a photo-receiving element. As other application, for example, a rotator may be mentioned.

Now, the present invention will be described in detail with reference to Examples. However, it should be understood that the present invention is by no means restricted to such specific Examples.

EXAMPLE 1

A compound (1A-1a) which is the compound (1A-1) wherein p=6 was prepared as follows in accordance with the above preparation method 1.
1) Preparation of Compound (13)
First, a compound (13) was prepared from a compound (11) in accordance with the following reaction formula:

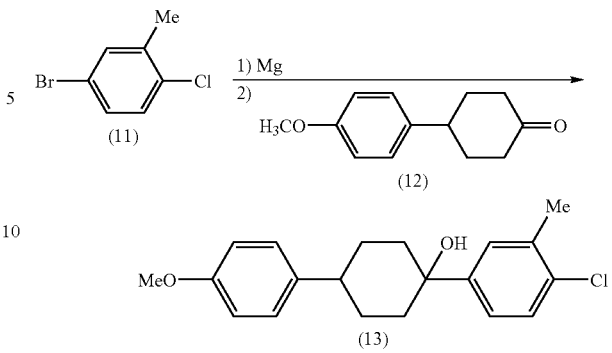

Into a 500 mL four-necked flask equipped with a reflux condenser, a stirrer and a dropping apparatus, magnesium (5.08 g, 0.212 mol) and iodine (0.1 g) were added, and then 2 to 3 drops of a solution comprising the compound (11) (43.2 g, 0.212 mol) in dehydrated tetrahydrofuran (THF) (300 mL) were dropwise added in a nitrogen stream, followed by heating with a dryer. After the reaction started and color by iodine changed to colorless, the rest of the solution was dropwise added over a period of 30 minutes. The dropwise addition was slowly carried out so that the reaction temperature would not increase. After completion of the dropwise addition, stirring was carried out at room temperature for 3 hours to prepare a Grignard reagent. Then, the four-necked flask was cooled to 0° C., and a solution of the compound (12) (36 g, 0.176 mol) in dehydrated tetrahydrofuran (300 mL) was dropwise added over a period of 30 minutes in a nitrogen stream. After completion of the dropwise addition, stirring was carried out at 70° C. for 3 hours with reflux, and a 1 mol/L aqueous ammonium chloride solution (100 mL) was added to stop the reaction.

After completion of the reaction, water and ethyl acetate were added for liquid separation, and the organic layer was recovered. The recovered organic layer was washed with a saturated sodium chloride aqueous solution and then washed with water, whereupon the organic layer was again recovered. The organic layer was dried over anhydrous magnesium sulfate, followed by filtration under reduced pressure to remove the anhydrous magnesium sulfate. The filtrate was concentrated to obtain a mixture containing the compound (13). In this stage, no further purification was carried out to carry out the following preparation step.

2) Preparation of Compound (14)
Then, a compound (14) was prepared from the compound (13) in accordance with the following reaction formula:

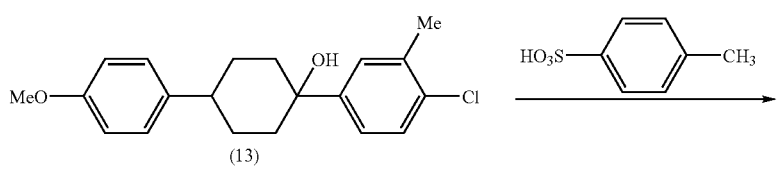

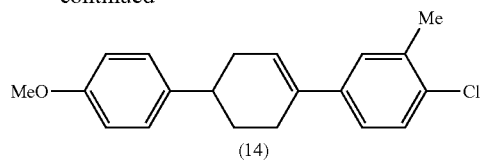

(14)

Into a 500 mL egg-plant form flask equipped with a reflux condenser and a stirrer, the mixture containing the compound (13), p-toluenesulfonic acid monohydrate (4.28 g, 0.025 mol) and toluene (200 mL) were added. Then, an isobaric dropping funnel containing a molecular sieve 4A (20 g) was attached to the egg-plant form flask, and stirring and refluxing were carried out at 110° C. for 4 hours. After completion of the reaction, water and ethyl acetate were added for liquid separation to recover an organic layer. The recovered organic layer was washed with a saturated sodium chloride aqueous solution and then washed with water, and the organic layer was again recovered. The organic layer was dried over anhydrous magnesium sulfate, followed by filtration under reduced pressure to remove the anhydrous magnesium sulfate, and the filtrate was concentrated. The obtained filtrate was purified by column chromatography using dichloromethane/hexane as a developer to obtain a compound (14) (27.5 g). The yield was 50%.

3) Preparation of Compound (16)

Then, a compound (16) was prepared from the compound (14) in accordance with the following reaction formula:

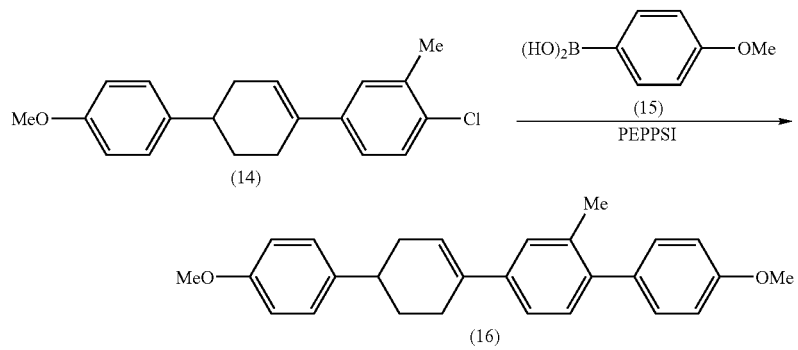

Into a 1,000 mL four-necked flask equipped with a reflux condenser, a stirrer and a dropping apparatus, the compound (14) (13 g, 0.04 mol), the compound (15) (10 g, 0.064 mol), (1,3-diisopropylimidazol-2-ylidnen)(3-chloropyridyl)palladium(II) dichloride (abbreviation: PEPPSI) manufactured by Sigma-Aldrich Japan (0.57 g, 0.0008 mol) and potassium carbonate (20 g, 0.14 mol) were added. Dioxane (140 mL) was added thereto in a nitrogen stream, followed by reflux at 65° C. for 18 hours with stirring. After completion of the reaction, water and ethyl acetate were added for liquid separation, and the organic layer was recovered. The recovered organic layer was washed with a saturated sodium chloride aqueous solution and then washed with water, and the organic layer was again recovered. The organic layer was dried over anhydrous magnesium sulfate, followed by filtration under reduced pressure to remove the anhydrous magnesium sulfate, and the filtrate was concentrated.

The obtained filtrate was purified by column chromatography using dichloromethane/hexane as a developer, and a fraction containing the desired product was concentrated to obtain a powder crystal. To this powder crystal, a solvent mixture of dichloromethane and hexane was added for recrystallization thereby to obtain a compound (16) (13.6 g). The yield was 85%.

4) Preparation of Compound (17)

Then, a compound (17) was prepared from the compound (16) in accordance with the following reaction formula:

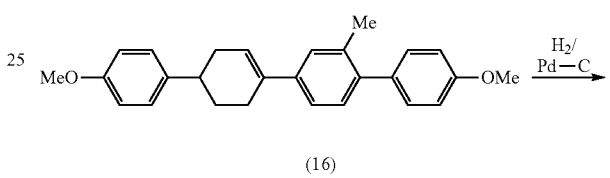

(16)

-continued (17)

Into a 500 mL four-necked flask, the compound (16) (13.6 g, 0.035 mol), tetrahydrofuran (200 mL) and 10% palladium-activated carbon (2.8 g) were added. While hydrogen was introduced under a pressure of 0.4 MPa, stirring was carried out at room temperature for 24 hours. After completion of the reaction, filtration was carried out to remove the catalyst. Then, the filtrate was concentrated to obtain a cis-trans mixture of the compound represented by the above formula (17). The cis-trans mixture is a mixture of a compound represented by the formula (17) wherein two substituents bonded to the cyclohexylene ring are bonded at trans-positions and a compound wherein such substituents are bonded at cis-positions. Hereinafter, a compound wherein two substituents in the cyclohexylene ring are bonded at trans-positions will be referred to as a trans-isomer, and a compound wherein they are bonded at cis-positions will be referred to be a cis-isomer.

To such a mixture of isomers, hexane (100 mL) was added for recrystallization to obtain a trans-isomer of the compound represented by the formula (17) (4.2 g, 0.011 mol). Further, the filtrate obtained at the time of recovering the crystal of the trans-isomer, was concentrated and put in a 500 mL egg-plant form flask. Then, t-butoxy potassium (28.0 g, 0.25 mol), N,N-dimethylformamide (100 mL) and tetrahydrofuran (100 mL) were added thereto, followed by refluxing at 100° C. for 6 hours with stirring to convert the cis-isomer of the compound represented by the formula (17) to the tarns-isomer. After completion of the reaction, water and ethyl acetate were added for liquid separation, and the organic layer was recovered. The recovered organic layer was washed with a saturated sodium chloride aqueous solution and then washed with water, and the organic layer was again recovered. The organic layer was dried over anhydrous magnesium sulfate, followed by filtration under reduced pressure to remove anhydrous magnesium sulfate, and the filtrate was concentrated. To the obtained filtrate, hexane was added, and recrystallization was carried out to obtain a trans-isomer of the compound represented by the formula (17) (6.8 g). The total amount of the compound (17) being the trans-isomer was 11 g (0.0285 mol), and the yield was 80%.

5) Preparation of Compound (18)

Then, a compound (18) was prepared from the compound (17) in accordance with the following reaction formula:

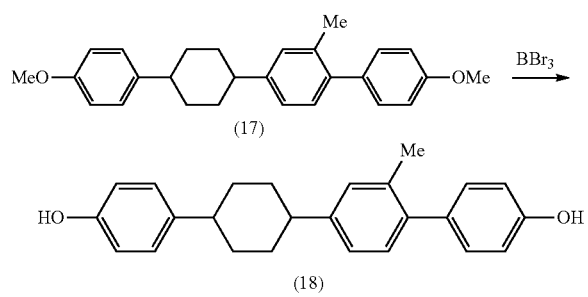

Into a 500 mL four-necked flask equipped with a reflux condenser, a stirrer and a dropping apparatus, the compound (17) (11.00 g, 0.029 mol) and dichloromethane (200 mL) were added. Then, in a nitrogen stream, boron tribromide (33.8 g, 0.137 mol) was dropwise added over a period of 30 minutes. The dropwise addition operation was carried out at 0° C. under cooling with ice so that the internal temperature did not exceed 10° C. Stirring was continued at room temperature for 3 hours, and then, the reactor was cooled with ice, and water was added at 0° C. to stop the reaction. After completion of the reaction, water and ethyl acetate were added for liquid separation, and the organic layer was recovered. The recovered organic layer was washed with a saturated sodium chloride aqueous solution and then washed with water, whereupon the organic layer was again recovered. The organic layer was dried over anhydrous magnesium sulfate, followed by filtration under reduced pressure to remove the anhydrous magnesium sulfate, and the filtrate was concentrated. Recrystallization was carried out from the filtrate using a solvent mixture of dichloromethane and hexane to obtain a compound (18) (9.3 g). The yield was 90%.

6) Preparation of Compound (1A-1a)

Then, a compound (1A-1a) was prepared from the compound (18) in accordance with the following reaction formula:

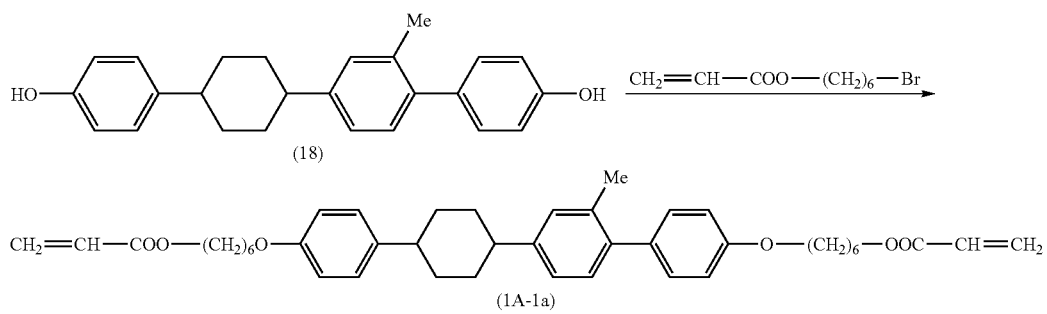

Into a 500 mL four-necked flask equipped with a reflux condenser, a stirrer and a dropping apparatus, the compound (18) (2.0 g, 0.0056 mol), $CH_2=CH-COO-(CH_2)_6-Br$ (5.22 g, 0.022 mol), potassium carbonate (3.08 g, 0.022 mol), potassium iodide (1 g) and acetone (50 mL) were added, followed by stirring and refluxing at 60° C. for 24 hours. After completion of the reaction, water and ethyl acetate were added for liquid separation, and the organic layer was recovered. The recovered organic layer was washed with a saturated sodium chloride aqueous solution and then washed with water, whereupon the organic layer was again recovered. The organic layer was dried over anhydrous magnesium sulfate, followed by filtration under reduced pressure to remove the anhydrous magnesium sulfate, and the filtrate was concentrated. The filtrate was purified by column chromatography using dichloromethane/hexane as a developer, and the fraction containing the desired product was concentrated to obtain a powder crystal. To this powder crystal, a solvent mixture of dichloromethane and hexane was added to carry out recrystallization thereby to obtain a compound (1A-1a) (2.04 g). The yield was 63%.

The $^1$HNMR spectrum of the compound (1A-1a) is shown below.

$^1$HNMR (400 MHz, solvent: CDCl$_3$, internal standard: tetramethoxysilane (TMS)) δ (ppm): 1.27(m,8H), 1.55 to 1.88(m,16H), 2.40(s,3H), 2.7(m,2H), 3.96(t,4H), 4.17(t,4H), 5.80 to 6.42(m,6H), 6.68(dd,2H), 6.84(dd,2H), 7.00 to 7.12 (m,4H), 7.25 to 7.40(m,3H).

The phase transition temperature from the crystal phase to the nematic phase of the compound (1A-1a) was 100° C.

EXAMPLE 2

A compound (1A-1b) which is a compound (1A-1) wherein p=4 was prepared as follows in accordance with the above preparation method 1.

First, a compound (18) was prepared in the same manner as in Example 1.

Then, a compound (1A-1b) was prepared from the compound (18) in accordance with the following reaction formula:

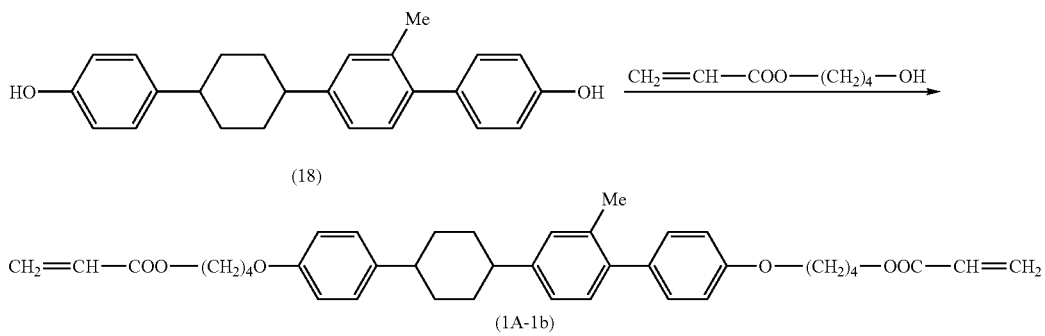

Into a 500 mL four-necked flask equipped with a reflux condenser, a stirrer and a dropping apparatus, the compound (18) (1.5 g, 0.0039 mol), 4-hydroxybutyl acrylate (1.40 g, 0.0097 mol) and triphenylphosphine (2.54 g, 0.0097 mol) were added, and they were dissolved in THF (25 mL). While nitrogen was introduced to the obtained solution, 4.0 g of diethyl azodicarboxylate (40% toluene solution) was slowly dropwise added under cooling in an ice bath, and the solution was reacted overnight. After completion of the reaction, water and ethyl acetate were added for liquid separation, and the organic layer was recovered. The recovered organic layer was washed with a saturated sodium chloride aqueous solution and then washed with water, whereupon the organic layer was again recovered. The organic layer was dried over anhydrous magnesium sulfate, followed by filtration under reduced pressure to remove the anhydrous magnesium sulfate, and the filtrate was concentrated. The filtrate was purified by column chromatography using dichloromethane/hexane as a developer, and the fraction containing the desired product was concentrated to obtain a powder crystal. To this powder crystal, a solvent mixture of dichloromethane and hexane was added for recrystallization thereby to obtain a compound (1A-1b) (1.36 g). The yield was 55%.

The $^1$HNMR spectrum of the compound (1A-1b) is shown below.

$^1$HNMR (400 MHz, solvent: CDCl$_3$, internal standard: TMS) δ (ppm): 1.54 to 1.89(m,16H), 2.40(s,3H), 2.73(m, 2H), 3.95(t,4H), 4.16(t,4H), 5.80 to 6.42(m,6H), 6.67(dd, 2H), 6.86(dd,2H), 7.0 to 7.1 (m,4H), 7.28 to 7.38(m,3H).

The phase transition temperature from the crystal phase to the nematic phase of the compound (1A-1b) was 98° C.

EXAMPLE 3

A compound (1A-3b) which is a compound (1A-3) wherein p=4 was prepared as follows in accordance with the above preparation method 1. That is, the following compound (19) was obtained in the same manner as in Example 1 except that 1-bromo-4-chlorobenzene was used instead of the compound (11). Then, a compound (1A-3b) was obtained from the compound (19) in the same manner as in Example 2.

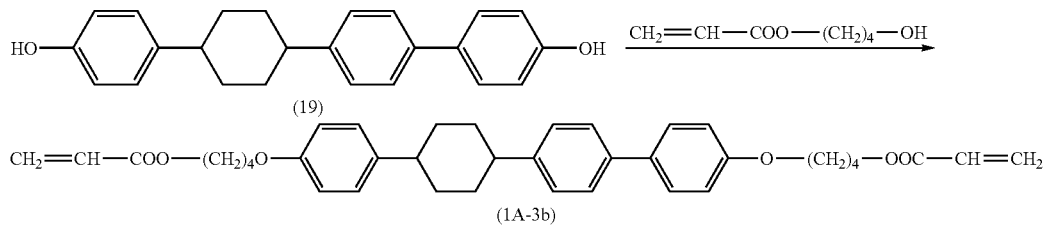

The $^1$HNMR spectrum of the compound (1A-3b) is shown below.

$^1$HNMR (400 MHz, solvent: CDCl$_3$, internal standard: TMS) δ (ppm): 1.54 to 1.89(m,16H), 2.71(m,2H), 3.97(t,4H), 4.18(t,4H), 5.82 to 6.45(m,6H), 6.67(dd,2H), 6.86(dd,2H), 7.00 to 7.20(m,4H), 7.30 to 7.38(m,4H).

The melting point of the compound (1A-3b) was 350° C. or above, and the phase transition to the liquid crystal phase could not be confirmed.

EXAMPLE 4

A compound (1C-1a) which is a compound (1C-1) wherein p=6 was prepared as follows in accordance with the above preparation method 4.

First, the following compound (31) was obtained in the same manner as in Example 1 except that a compound (25) was used instead of the compound (11). At this stage, no further purification was carried out to carry out the following preparation step:

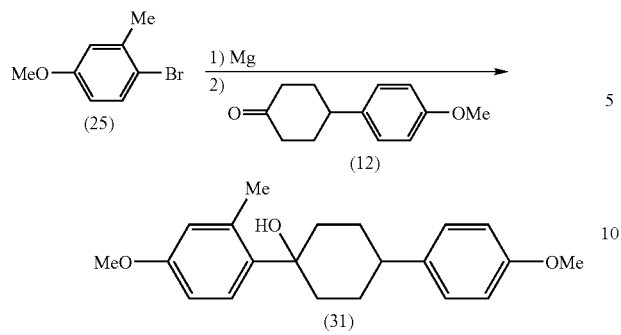

Then, in the same manner as in Example 1, a compound (34) was obtained from the compound (31), and then a compound (1C-1a) was obtained from the compound (34):

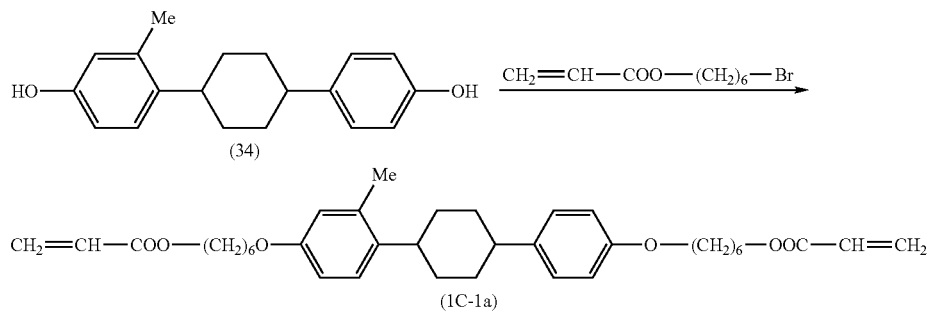

The $^1$HNMR spectrum of the compound (1C-1a) is shown below.

$^1$HNMR (400 MHz, solvent: CDCl$_3$, internal standard: TMS) δ (ppm): 1.32(m,8H), 1.58 to 1.88(m,16H), 2.36(s, 3H), 2.70(m,2H), 3.98(t,4H), 4.16(t,4H), 5.79 to 6.40(m,6H), 6.50(m,2H), 6.71 (m,2H), 6.90 to 7.01 (m,3H)

The compound (1C-1a) was liquid at room temperature and did not show liquid crystallinity by itself.

EXAMPLE 5

A compound (1C-1b) which is a compound (1C-1) wherein p=4 was prepared as follows in accordance with the above preparation method 4. That is, a compound (1C-1b) was obtained from the compound (34) in accordance with the following reaction formula in the same manner as in Example 2:

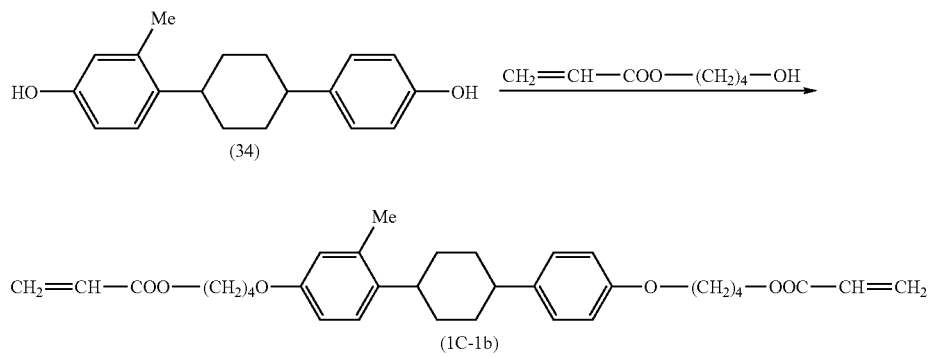

The $^1$HNMR spectrum of the compound (1C-1b) is shown below.

$^1$HNMR (400 MHz, solvent: CDCl$_3$, internal standard: TMS) δ (ppm): 1.59 to 1.90(m,16H), 2.38(s,3H), 2.71(m, 2H), 3.98(t,4H), 4.16(t,4H), 5.79 to 6.42(m,6H), 6.52(m,2H), 6.73(m,2H), 6.88 to 7.1 (m,3H).

The compound (1C-1b) had a melting point of 49° C. and did not show liquid crystallinity by itself.

EXAMPLE 6

A compound (1C-3a) which is a compound (1C-3) wherein p=6 was prepared as follows in accordance with the above preparation method 4. That is, a compound (35) was obtained in the same manner as in Example 4 except that 4-bromophenylboronic acid was used instead of the compound (25). Then, a compound (1C-3a) was obtained from the compound (35) in accordance with the following reaction formula:

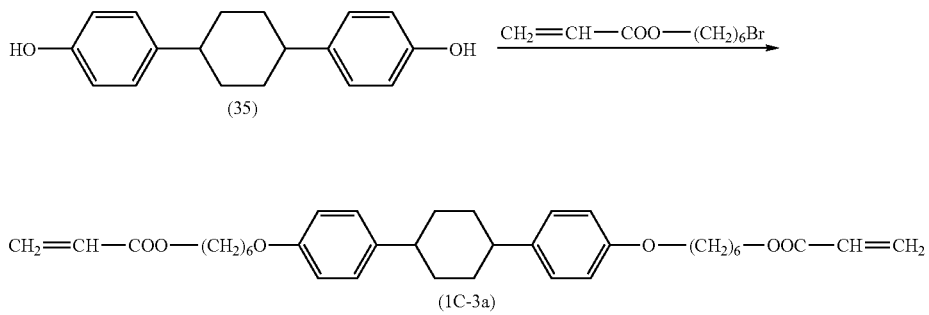

The $^1$HNMR spectrum of the compound (1C-3a) is shown below.

$^1$HNMR (400 MHz, solvent: CDCl$_3$, internal standard: TMS) δ (ppm): 1.30(m,8H), 1.59 to 1.87(m,16H), 2.75(m, 2H), 3.97(t,4H), 4.18(t,4H), 5.8 to 6.4(m,6H), 6.68(dm,4H), 7.1(m,4H).

The phase transition temperature from the crystal phase to the nematic phase of the compound (1C-3a) was 113° C.

EXAMPLE 7

A compound (1C-3b) which is a compound (1C-3) wherein p=4 was prepared as follows in accordance with the above preparation method 4. That is, a compound (1C-3b) was obtained from the compound (35) obtained in Example 6 in accordance with the following reaction formula:

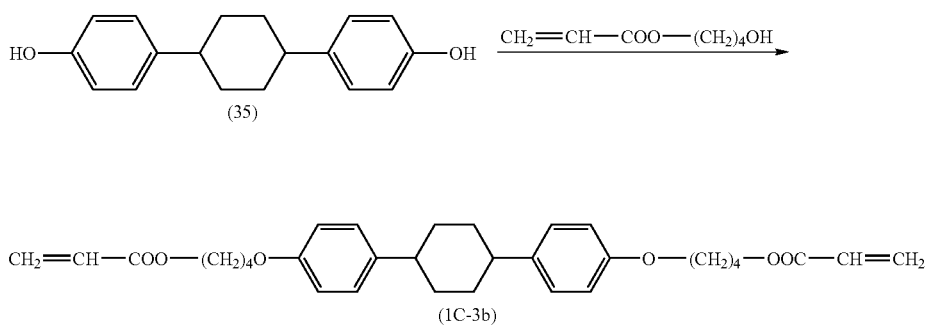

The ¹HNMR spectrum of the compound (1C-3b) is shown below.

¹HNMR (400 MHz, solvent: CDCl₃, internal standard: TMS) δ (ppm): 1.56 to 1.89(m,16H), 2.72(m,2H), 3.93(t,4H), 4.12(t,4H), 5.8 to 6.38(m,6H), 6.66(dm,4H), 7.06(m,4H).

The phase transition temperature from the crystal phase to the nematic phase of the compound (1C-3b) was 139° C.

EXAMPLES 8 TO 20

Preparation of Liquid Crystal Composition

The bifunctional polymerizable compound of the present invention and other polymerizable liquid crystal were mixed in a proportion as identified in Table 1 to obtain liquid crystal compositions A to M. Here, the proportion shown in Table 1 is a proportion (mol %) of each polymerizable liquid crystal based on all polymerizable liquid crystals constituting the liquid crystal composition. Further, as other polymerizable liquid crystal, the following compounds (2-1-1a), (2-1-1b), (2-2-1a), (2-2-1b), (2-2-2a) and (2-2-2b) were used.

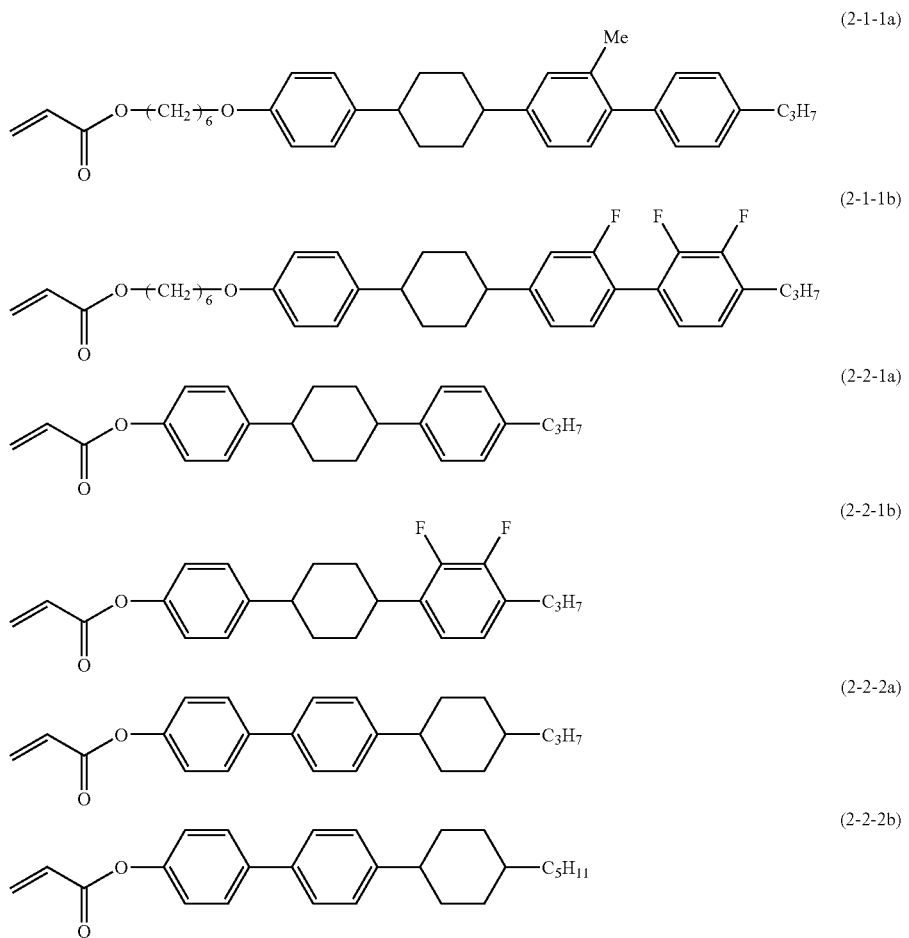

Then, to each of the liquid crystal compositions A to M, a polymerization initiator was added to obtain liquid crystal compositions A1 to M1. The proportion of the polymerization initiator was 0.5 mass % based on the liquid crystal composition. Table 2 shows Tc ($T_{I \to N}$) and Tm ($T_{N \to C}$) at the time of lowering the temperature of the liquid crystal compositions A to M, and the Δn values of polymers of the liquid crystal compositions A1 to M1.

TABLE 1

| Liquid crystal composition | Bifunctional polymerizable compound of the present invention (mol %) | | | | | | | Polymerizable nematic liquid crystal (mol %) | | | | | |
|---|---|---|---|---|---|---|---|---|---|---|---|---|---|
| | 1A-1a | 1A-1b | 1A-3b | 1C-1a | 1C-1b | 1C-3a | 1C-3b | 2-1-1a | 2-1-1b | 2-2-1a | 2-2-1b | 2-2-2a | 2-2-2b |
| Ex. 8  A | 7  | 0 | 0 | 0 | 0 | 0  | 0  | 51.15 | 0     | 32.55 | 0     | 4.65 | 4.65 |
| Ex. 9  B | 15 | 0 | 0 | 0 | 0 | 0  | 0  | 46.75 | 0     | 29.75 | 0     | 4.25 | 4.25 |
| Ex. 10 C | 25 | 0 | 0 | 0 | 0 | 0  | 0  | 41.25 | 0     | 26.25 | 0     | 3.75 | 3.75 |
| Ex. 11 D | 0  | 7 | 0 | 0 | 0 | 0  | 0  | 51.15 | 0     | 32.55 | 0     | 4.65 | 4.65 |
| Ex. 12 E | 0  | 0 | 7 | 0 | 0 | 0  | 0  | 51.15 | 0     | 32.55 | 0     | 4.65 | 4.65 |
| Ex. 13 F | 0  | 0 | 0 | 7 | 0 | 0  | 0  | 51.15 | 0     | 32.55 | 0     | 4.65 | 4.65 |
| Ex. 14 G | 0  | 0 | 0 | 0 | 7 | 0  | 0  | 51.15 | 0     | 32.55 | 0     | 4.65 | 4.65 |
| Ex. 15 H | 0  | 0 | 0 | 0 | 0 | 7  | 0  | 51.15 | 0     | 32.55 | 0     | 4.65 | 4.65 |
| Ex. 16 I | 0  | 0 | 0 | 0 | 0 | 15 | 0  | 46.75 | 0     | 29.75 | 0     | 4.25 | 4.25 |
| Ex. 17 J | 0  | 0 | 0 | 0 | 0 | 0  | 7  | 51.15 | 0     | 32.55 | 0     | 4.65 | 4.65 |
| Ex. 18 K | 0  | 0 | 0 | 0 | 0 | 0  | 15 | 46.75 | 0     | 29.75 | 0     | 4.25 | 4.25 |
| Ex. 19 L | 0  | 7 | 0 | 0 | 0 | 0  | 0  | 0     | 51.15 | 0     | 41.85 | 0    | 0    |
| Ex. 20 M | 0  | 7 | 0 | 0 | 0 | 0  | 0  | 0     | 51.15 | 41.85 | 0     | 0    | 0    |

TABLE 2

| | Liquid crystal composition | Phase transition temperature (° C.) | | Δn of polymer (λ = 405 nm) |
|---|---|---|---|---|
| | | $T_{I \to N}$ | $T_{N \to C}$ | |
| Ex. 8  | A | 157.9 | ≦30 | 0.151 |
| Ex. 9  | B | 157.2 | ≦30 | 0.144 |
| Ex. 10 | C | 156.8 | ≦30 | 0.144 |
| Ex. 11 | D | 158.6 | ≦30 | 0.147 |
| Ex. 12 | E | 167.0 | 40  | 0.153 |
| Ex. 13 | F | 129.0 | 38  | 0.131 |
| Ex. 14 | G | 122.0 | 34  | 0.132 |
| Ex. 15 | H | 152.0 | 37  | 0.141 |
| Ex. 16 | I | 146.0 | 46  | 0.141 |
| Ex. 17 | J | 147.0 | 39  | 0.145 |
| Ex. 18 | K | 153.0 | 39  | 0.144 |
| Ex. 19 | L | 164.0 | ≦30 | 0.153 |
| Ex. 20 | M | 177.0 | ≦30 | 0.173 |

EXAMPLES 21 TO 24

Preparation and Polymerization of Cholesteric Liquid Crystal Composition

First, the following polymerizable chiral dopant (3-1a) was added to each of the liquid crystal compositions A1, B1, L1 and M1 to obtain cholesteric liquid crystal compositions A2, B2, L2 and M2. The amounts of the chiral dopant (3-1a) added to the nematic liquid crystal compositions A1, B1, L1 and M1 are as identified in Table 3. Specifically, the addition amount was preliminarily prepared so that the short wavelength end of the selective reflection of the cholesteric polymers A3, B3, L3 and M3 are substantially at the same level as after-mentioned corresponding Comparative Examples.

supports were bonded to each other by use of an adhesive agent so that the surfaces which were treated for alignment faced each other, whereby a cell was prepared. Glass beads having a diameter of 15 μm were added to the adhesive agent so that the space between the supports were adjusted to 15 μm.

Then, each of the cholesteric liquid crystal compositions A2, B2, L2 and M2 was injected into the above cell at 90° C., and irradiated with ultraviolet light with an intensity of 130 mW/cm² at 40° C. for 3 minutes to carry out photopolymerization thereby to obtain cholesteric polymers A3, B3, L3 and M3. Such polymers were horizontally aligned in the rubbing direction of the substrate. Further, each polymer reflected right-handed circularly polarized light.

Table 3 shows the amount of the chiral dopant added to the composition used for preparation of the cholesteric polymers A3, B3, L3 and M3, the value of the short wavelength end in the selective reflection region, the right-handed circularly polarized light transmittance (short wavelength end −60 nm ("−" means a minus sign, the same applies hereinafter)) and the left-handed circularly polarized light transmittance (short wavelength end −60 nm). The value of the transmittance is represented as "the short wavelength end −60 nm" so as to standardize the value of the transmittance of the right-handed circularly polarized light which is selectively reflected (the same applies hereinafter).

EXAMPLE 25

A cholesteric polymer A4 was obtained by adding 8.6 mass % of the chiral dopant (3-1a) to the liquid crystal composition A1 in the same manner as in Examples 21 to 24. Table 3 shows

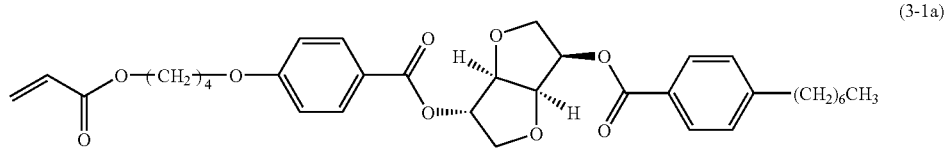

(3-1a)

The cholesteric compositions A2, B2, L2 and M2 were polymerized by the following method.

To a glass substrate of 5 cm×5 cm×0.5 mm in thickness, a polyimide solution was applied by spin-coating and dried. Then, rubbing treatment in a predetermined direction with a nylon cloth was carried out to prepare a support. Two such the amount of the chiral dopant added, the value of the short wavelength end in the selective reflection region, the right-handed circularly polarized light transmittance (short wavelength end −60 nm) and the left-handed circularly polarized light transmittance (short wavelength end −60 nm) of the cholesteric polymer A4.

TABLE 3

| | Cholesteric polymer | Amount of chiral dopant added (mass %) | Short Wavelength end of selective reflection region (nm) | Transmittance of right-handed circularly polarized light | Transmittance of left-handed circularly polarized light |
|---|---|---|---|---|---|
| Ex. 21 | A3 | 9.4 | 468 | 87 | 94 |
| Ex. 22 | B3 | 9.9 | 467 | 85 | 92 |
| Ex. 23 | L3 | 7.5 | 522 | 91 | 99 |
| Ex. 24 | M3 | 9.4 | 468 | 84 | 95 |
| Ex. 25 | A4 | 8.6 | 510 | 91 | 98 |

COMPARATIVE EXAMPLE 1

As a Comparative Example with Examples 21 and 22, a liquid crystal composition a was obtained by mixing polymerizable nematic liquid crystals in a proportion as identified in Table 4. This composition contains no bifunctional polymerizable compound of the present invention. The proportion shown in Table 4 is a proportion (mol %) of each polymerizable liquid crystal based on all polymerizable liquid crystals constituting the liquid crystal composition.

Then, to the liquid crystal composition a, a polymerization initiator was added to obtain a liquid crystal composition a1. The proportion of the polymerization initiator was 0.5 mass % based on the liquid crystal composition. Table 5 shows Tc ($T_{I \to N}$) and Tm ($T_{N \to C}$) at the time of lowering the temperature of the liquid crystal composition a and the Δn value of a polymer of the liquid crystal composition a.

To the liquid crystal composition a, the polymerizable chiral dopant (3-1a) was added to obtain a cholesteric polymer a3 in the same manner as in Examples 21 to 24. Table 6 shows the amount of the chiral dopant added, the value of the short wavelength end in the selective reflection region, the right-handed circularly polarized light transmittance (short wavelength end −60 nm) and the left-handed circularly polarized light transmittance (short wavelength end −60 nm) of the cholesteric polymer a3. As evident from the results, the transmittance of the right-handed circularly polarized light was distinctively low as compared with Examples 21 and Example 22.

COMPARATIVE EXAMPLE 2

As a Comparative Example with Example 23, a liquid crystal composition b was obtained by mixing polymerizable nematic liquid crystals in a proportion as identified in Table 4. This composition contains no bifunctional polymerizable compound of the present invention.

Then, to the liquid crystal composition b, a polymerization initiator was added to obtain a liquid crystal composition b1. The proportion of the polymerization initiator was 0.5 mass % based on the liquid crystal composition. Table 5 shows Tc ($T_{I \to N}$) and Tm ($T_{N \to C}$) at the time of lowering the temperature of the liquid crystal composition b and the Δn value of a polymer of the liquid crystal composition b.

To the liquid crystal composition b, the polymerizable chiral dopant (3-1a) was added to obtain a cholesteric polymer b3 in the same manner as in Examples 21 to 24. Table 6 shows the amount of the chiral dopant added, the value of the short wavelength end in the selective reflection region, the right-handed circularly polarized light transmittance (short wavelength end −60 nm) and the left-handed circularly polarized light transmittance (short wavelength end −60 nm) of the cholesteric polymer b3. As evident from the results, the transmittance of the right-handed circularly polarized light was distinctively low as compared with Example 23.

COMPARATIVE EXAMPLE 3

As a Comparative Example with Example 24, a liquid crystal composition c was obtained by mixing polymerizable nematic liquid crystals in a proportion as identified in Table 4. This composition contains no bifunctional polymerizable compound of the present invention.

Then, to the liquid crystal composition c, a polymerization initiator was added to obtain a liquid crystal composition c1. The proportion of the polymerization initiator was 0.5 mass % based on the liquid crystal composition. Table 5 shows Tc ($T_{I \to N}$) and Tm ($T_{N \to C}$) at the time of lowering the temperature of the liquid crystal composition c and the Δn value of a polymer of the liquid crystal composition c.

To the liquid crystal composition c, the polymerizable chiral dopant (3-1a) was added to obtain a cholesteric polymer c3 in the same manner as in Examples 21 to 24. Table 6 shows the amount of the chiral dopant added, the value of the short wavelength end in the selective reflection region, the right-handed circularly polarized light transmittance (short wavelength end −60 nm) and the left-handed circularly polarized light transmittance (short wavelength end −60 nm) of the cholesteric polymer c3. As evident from the results, the transmittance of the right-handed circularly polarized light was distinctively low as compared with Example 24.

COMPARATIVE EXAMPLE 4

As a Comparative Example with Example 25, a nematic liquid crystal composition d was prepared by using the following comparative compound (1D) instead of the compound (1A-1a) used in Example 18. Specifically, a liquid crystal composition d was obtained in a proportion as identified in Table 4. This composition contains no bifunctional polymerizable compound of the present invention.

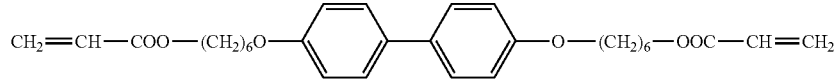

(1D)

Then, to the liquid crystal composition d, a polymerization initiator was added to obtain a liquid crystal composition d1. The proportion of the polymerization initiator was 0.5 mass % based on the liquid crystal composition. Table 5 shows the Δn value of a polymer of the liquid crystal composition d.

The polymerizable chiral dopant (3-1a) was added to the liquid crystal composition d to obtain a cholesteric polymer d3 in the same manner as in Examples 21 to 24. Table 6 shows the amount of the chiral dopant added, the value of the short wavelength end in the selective reflection region, the right-handed circularly polarized light transmittance (short wavelength end −60 nm) and the left-handed circularly polarized light transmittance (short wavelength end −60 nm) of the cholesteric polymer d3. As evident from the results, the transmittance of the right-handed circularly polarized light was distinctively low as compared with Example 25.

The entire disclosure of Japanese Patent Application No. 2008-209842 filed on Aug. 18, 2008 including specification, claims and summary is incorporated herein by reference in its entirety.

What is claimed is:

1. A bifunctional polymerizable compound represented by the following formula:

$$A\text{-}E^1\text{-}E^2\text{-}(E^3)_k\text{-}E^4\text{-}B$$

wherein
A is $CH_2\!=\!CR^1\!-\!COO(L^1)_m\text{-}$;
B is $CH_2\!=\!CR^2\!-\!COO\text{-}(L^2)_n\text{-}$;
each of $R^1$ and $R^2$ which are independent of each other, is a hydrogen atom or a methyl group;
each of $L^1$ and $L^2$ is $-\!(CH_2)_p\!-$ wherein p is each independently an integer of from 2 to 8, each of m and n which are independent of each other, is 0 or 1, provided that when m is 1, or when both m and n are 1, there may be an etheric oxygen atom between the carbon-carbon linkage of $-\!(CH_2)_p\!-$ or at the terminal on the side bonded to $E^1$ or $E^4$, and at least one hydrogen atom may be substituted by a fluorine atom, a chlorine atom or a methyl group;
each of $E^1$ and $E^4$ is a 1,4-phenylene group; and
one of $E^2$ and $E^3$ is a trans-1,4-cyclohexylene group and the other is a trans-1,4-cyclohexylene group or a 1,4-phenylene group, k is 0 or 1, provided that when k is 0, $E^2$ is

TABLE 4

| | Liquid crystal composition | Polymerizable nematic liquid crystal (mol %) | | | | | | Comparative compound (mol %) |
|---|---|---|---|---|---|---|---|---|
| | | 2-1-1a | 2-1-1b | 2-2-1a | 2-2-1b | 2-2-2a | 2-2-2b | 1D |
| Comp. Ex. 1 | a | 55.00 | 0 | 35.00 | 0 | 5.00 | 5.00 | 0 |
| Comp. Ex. 2 | b | 0 | 55.00 | 0 | 45.00 | 0 | 0 | 0 |
| Comp. Ex. 3 | c | 0 | 55.00 | 45.00 | 0 | 0 | 0 | 0 |
| Comp. Ex. 4 | d | 51.15 | 0 | 32.55 | 0 | 4.65 | 4.65 | 7.00 |

TABLE 5

| | Liquid crystal composition | Phase transition temperature (° C.) | | Δn of polymer (λ = 405 nm) |
|---|---|---|---|---|
| | | $T_{I \to N}$ | $T_{N \to C}$ | |
| Comp. Ex. 1 | a | 155.7 | ≦30 | 0.157 |
| Comp. Ex. 2 | b | 168.0 | ≦30 | 0.146 |
| Comp. Ex. 3 | c | 181.0 | ≦30 | 0.173 |
| Comp. Ex. 4 | d | — | — | 0.150 |

TABLE 6

| | Cholesteric polymer | Amount of chiral dopant added (mass %) | Short Wavelength end of selective reflection region (nm) | Transmittance of right-handed circularly polarized light | Transmittance of left-handed circularly polarized light |
|---|---|---|---|---|---|
| Comp. Ex. 1 | a3 | 9.3 | 463 | 74 | 92 |
| Comp. Ex. 2 | b3 | 7.5 | 517 | 38 | 90 |
| Comp. Ex. 3 | c3 | 9.1 | 473 | 76 | 89 |
| Comp. Ex. 4 | d3 | 8.5 | 515 | 74 | 65 | a trans-1,4-cyclohexylene group, and the 1,4-phenylene group and the trans-1,4-cyclohexylene group as $E^1$ to $E^4$ may be each independently such that at least one hydrogen atom bonded to a carbon atom(s) constituting the cyclic group may be substituted by a fluorine atom, a chlorine atom or a methyl group.

2. The bifunctional polymerizable compound according to claim 1,
wherein A and B are the same.

3. The bifunctional polymerizable compound according to claim 1, wherein $-E^1-E^2-(E^3)_k-E^4-$ is -Ph-Cy-Ph-Ph-, -Ph-Cy-Cy-Ph- or -Ph-Cy-Ph-, wherein -Ph- is a 1,4-phenylene group, and -Cy- is a trans-1,4-cyclohexylene group.

4. The bifunctional polymerizable compound according to claim 1, wherein m and n are 1.

5. The bifunctional polymerizable compound according to claim 1, wherein at least one of $E^1$ to $E^4$ is a 1,4-phenylene group or a trans-1,4-cyclohexylene group having at least one hydrogen atom bonded to a carbon atom(s) substituted by a methyl group.

6. A liquid crystal composition comprising the bifunctional polymerizable compound as defined in claim 1.

7. A cholesteric liquid crystal composition comprising the bifunctional polymerizable compound as defined in claim 1, a monofunctional polymerizable compound and a polymerizable chiral material.

8. An optical anisotropic material comprising a polymer obtained by polymerizing the liquid crystal composition as defined in claim 6 in a state where the composition shows a liquid crystal phase and the liquid crystal is aligned.

9. An optical element having a structure in which the optical anisotropic material as defined in claim 8 is sandwiched between a pair of supports.

10. The bifunctional polymerizable compound according to claim 1, which is selected from the group consisting of the following compounds (1A) to (1C):

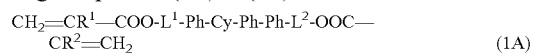
(1A)

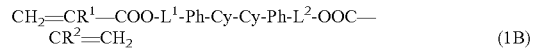
(1B)

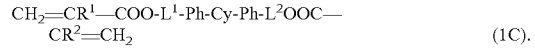
(1C).

11. The bifunctional polymerizable compound according to claim 10, wherein $R^1$ is a hydrogen atom.

12. The bifunctional polymerizable compound according to claim 11, wherein $R^2$ is a hydrogen atom.

13. The bifunctional polymerizable compound according to claim 12, wherein each of $L^1$ and $L^2$ is $-(CH_2)_pO-$, wherein P is each independently an integer of from 4 to 6.

14. The bifunctional polymerizable compound according to claim 1, which is selected from the group consisting of the following compounds:

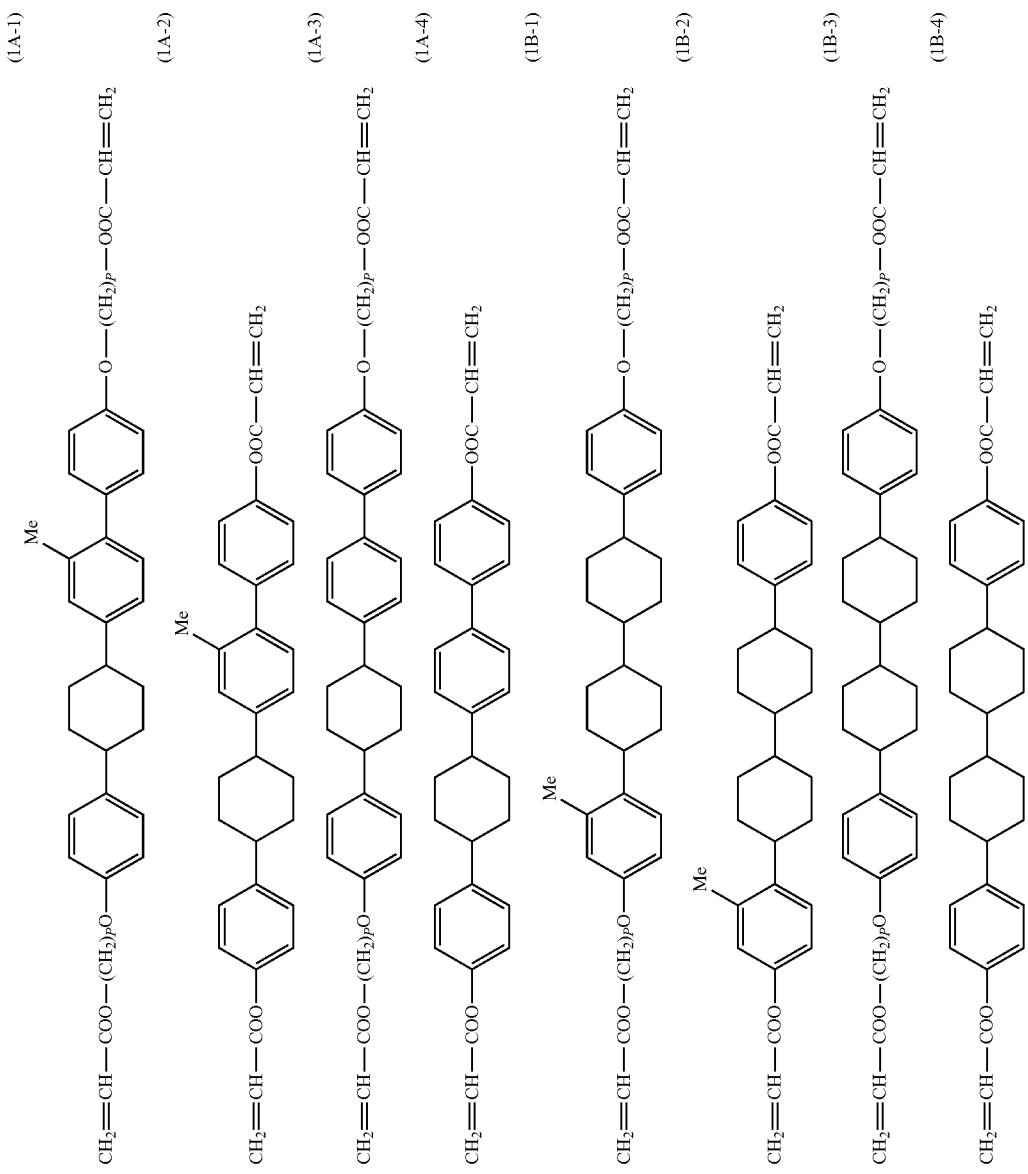

-continued
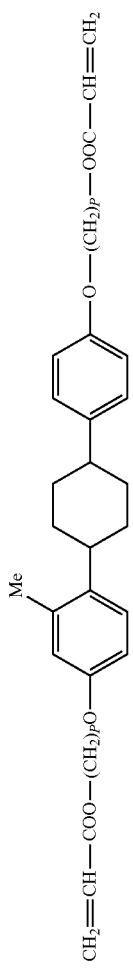 (1C-1)
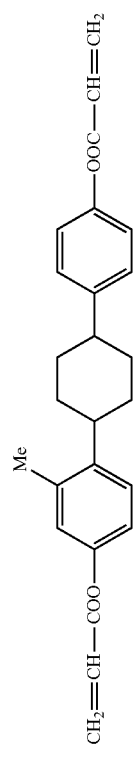 (1C-2)
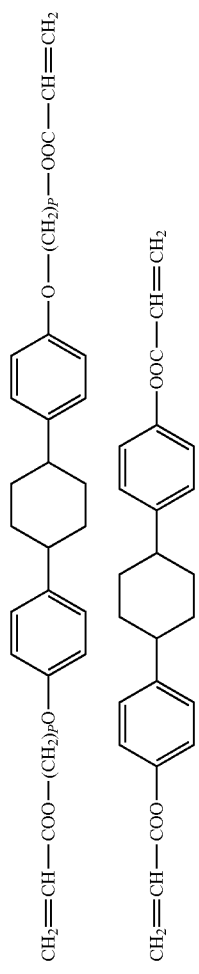 (1C-3)
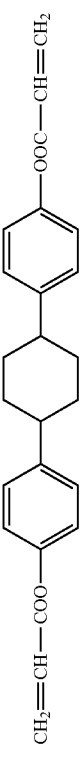 (1C-4)

15. The optical anisotropic material according to claim 8, wherein said polymerizing is carried out at an atmospheric temperature no higher than the cholesteric phase/isotropic phase transition temperature (Tc) of the liquid crystal composition.

16. The optical anisotropic material according to claim 15, wherein said polymerizing is carried out at an atmospheric temperature no higher than Tc−10.

* * * * *